United States Patent
Lin et al.

(10) Patent No.: US 9,163,135 B2
(45) Date of Patent: Oct. 20, 2015

(54) RUBBER COMPOSITIONS WITH FILLER AND KETOXIME OR KETIXMO SILANE

(75) Inventors: Chenchy J. Lin, Almere (NL); Yaohong Chen, Akron, OH (US); Atsushi Fukushima, Chuo-Ku (JP); William L. Hergenrother, Akron, OH (US); Terrence E. Hogan, Uniontown, OH (US)

(73) Assignee: Bridgestone Corporation, Tokyo (JP)

( * ) Notice: Subject to any disclaimer, the term of this patent is extended or adjusted under 35 U.S.C. 154(b) by 56 days.

(21) Appl. No.: 13/819,815

(22) PCT Filed: Aug. 31, 2011

(86) PCT No.: PCT/US2011/050036
§ 371 (c)(1),
(2), (4) Date: Jul. 9, 2013

(87) PCT Pub. No.: WO2012/031005
PCT Pub. Date: Mar. 8, 2012

(65) Prior Publication Data
US 2013/0281588 A1    Oct. 24, 2013

Related U.S. Application Data

(60) Provisional application No. 61/378,538, filed on Aug. 31, 2010.

(51) Int. Cl.
*C08L 9/00* (2006.01)
*C08K 5/5465* (2006.01)
*C08K 5/548* (2006.01)

(52) U.S. Cl.
CPC .............. *C08K 5/5465* (2013.01); *C08K 5/548* (2013.01)

(58) Field of Classification Search
CPC ........... B60C 1/00; C08F 36/06; C08F 36/08; C08K 5/5465; C08K 3/36; C08K 5/548
USPC ......................... 524/575, 571, 573
See application file for complete search history.

(56) References Cited

U.S. PATENT DOCUMENTS

| | | | | |
|---|---|---|---|---|
| 3,635,743 | A | * | 1/1972 | Smith ............................ 106/490 |
| 3,962,160 | A | * | 6/1976 | Beers et al. ...................... 528/18 |
| 4,143,027 | A | * | 3/1979 | Sollman et al. ............... 524/571 |
| 4,323,489 | A | | 4/1982 | Beers |
| 4,555,560 | A | | 11/1985 | Saruyama et al. |
| 5,405,930 | A | | 4/1995 | Mathew et al. |
| 5,514,766 | A | | 5/1996 | Mathew et al. |
| 5,534,588 | A | | 7/1996 | Knepper et al. |
| 5,821,290 | A | | 10/1998 | Labauze |
| 6,211,278 | B1 | | 4/2001 | Vanel |
| 6,492,469 | B2 | | 12/2002 | Willis et al. |
| 2006/0106143 | A1 | | 5/2006 | Lin et al. |
| 2008/0146745 | A1 | | 6/2008 | Luo et al. |
| 2008/0299046 | A1 | | 12/2008 | White et al. |
| 2009/0163675 | A1 | | 6/2009 | Chen et al. |
| 2009/0203826 | A1 | | 8/2009 | Rachita et al. |
| 2010/0119715 | A1 | | 5/2010 | Sostmann et al. |
| 2011/0028639 | A1 | | 2/2011 | Knepper et al. |

FOREIGN PATENT DOCUMENTS

| | | | |
|---|---|---|---|
| DE | 1812039 | * | 8/1969 |
| EP | 0280499 | B1 | 4/1994 |
| KR | 1020080011431 | A | 2/2008 |
| WO | 2009034016 | A1 | 3/2009 |

OTHER PUBLICATIONS

DE 1812039 machine translation (1969).*
Choi, Seung Sam, Apr. 9, 2012 International Search Report with Written Opinion from PCT/US2011/050036 (9 pp.).
Office Action from the People Republic of China Patent Office, Chinese Application No. 201180042066.1 (Mar. 10, 2014) 7 pages.
Nov. 21, 2014, Second Office Action for Chinese Patent Application No. 201180042066.1, (7 pp.).
Scheid, Gunther, "Supplementary European Search Report for European Patent Application No. 11822592.9", Mailed: Dec. 19, 2014, 5 pages.

* cited by examiner

*Primary Examiner* — Kuo-Liang Peng
(74) *Attorney, Agent, or Firm* — Meredith E. Hooker; Nathan T. Lewis

(57) ABSTRACT

A composition includes an elastomer and a ketoximo silane or a ketoxime additive. The ketoximo silane corresponds to Formula I: where D is selected from a $C_1$ to $C_{60}$ hydrocarbyl group, or when A is 0 or 1 a hydrogen, or the structure in Formula III; and wherein n and j are independently 1, 2, or 3, m and q are independently 0 or 1, z and t are independently 0 or 1 and (n+m+z) is equal to 3 and (j+q+t) is equal to 3; A is 0 or greater than or equal to 1; $R_1$ and $R_2$ are independently Ci to $C_{60}$ divalent organic groups and may optionally include O, N S, Si, and/or P heteroatoms with the proviso that when A is 0 either of $R_1$ and $R_2$ may be a chemical bond; $R_3$, $R_4$, $R_8$ and $R_9$ are independently a hydrogen, or a $C_1$ to $C_{60}$ hydrocarbyl or alkoxy group optionally including O, N, S, Si and/or P; R5 and R6 are independently hydrogen or $C_1$ to $C_{60}$ hydrocarbyl groups and may optionally include O, N S, Si, and/or P heteroatoms, and may optionally be bonded together to form a cyclic ring; $R_{10}$ and $R_{11}$ are independently hydrogen or $C_1$ to $C_{60}$ hydrocarbyl groups and may optionally include O, N S, Si, and/or P heteroatoms, and may optionally be bonded together to form a cyclic ring.

17 Claims, 2 Drawing Sheets

RUBBER COMPOSITIONS WITH FILLER AND KETOXIME OR KETIXMO SILANE

CROSS-REFERENCE TO RELATED APPLICATION

This application claims the benefit of priority of U.S. Provisional Application No. 61/378,538, filed Aug. 31, 2010, which is hereby incorporated by reference.

FIELD

This technology generally relates to inorganic filler shielding and coupling agents and the use of such agents as dispersing and reinforcement agents in vulcanizable elastomeric compounds containing inorganic fillers and carbon black as a reinforcing filler.

BACKGROUND

When producing elastomeric compositions for use in rubber articles, such as tires, power belts, or vibration isolation components, it is desirable that these elastomeric compositions are processable during compounding. It is also desirable that reinforcing fillers, such as silica and/or carbon black, be well dispersed throughout the rubber in order to improve various physical properties, such as the compound Mooney viscosity, modulus, viscoelastic properties such as hysteresis loss (tan δ), and wear resistance.

Mixing silica into rubber stocks, however, presents challenges because silica particles containing polar silanol groups on the surface tend to self-associate and reagglomerate extensively after compounding, leading to poor silica dispersion and a high compound viscosity. The strong and highly developed silica filler network results in a rigid uncured compound that is difficult to process in downstream processes, such as extrusion and curing operations.

Silica shielding and coupling agents have been developed to alleviate this problem; however, a feature of conventional silica dispersing agents is the presence of one or more alkoxysilane groups that react with the silanol groups on the silica surface (the silanization reaction) during mixing of the rubber compound. This reaction causes the evolution and release of alcohol into the environment. In particular, when the mixing is conducted at high processing temperatures, alcohol is released and contributes to the volatile organic compounds (VOCs) generated during processing of the rubber compounds. At lower processing temperatures, the compounded product can retain a considerable amount of unreacted alkoxysilyl groups that are available to further react with the silica and moisture during storage, extrusion, tire build, and/or curing, resulting in an undesirable increase in the compound viscosity, a shorter shelf life, and the associated porosity issues. This continuing reaction in the compounded product evolves additional alcohol that may impair further processing of the compound and final product quality. As a result, a decreased extrusion rate of the resulting compounds may be utilized to ensure the drawn composition conforms to specifications. In addition, special attention during curing is given to prevent the porosity formed in the final product. These methods of dealing with the VOC generation result in decreased production and concomitant increase in cost.

Several approaches to reduce VOC evolution have been tried, but the shielding level produced was not as good as that which could be obtained with organosiloxanes. The organosiloxanes can cause an evolution of up to 25% of their initially added weight as ethanol when mixed with rubber in an initial mixing step, followed by an additional 15% during the curing stage, followed by an additional 10% slowly being evolved during use.

SUMMARY

In an embodiment, a composition includes an elastomer, a ketoximo silane, and an inorganic filler. The ketoximo silane corresponds to Formula I:

where B defined as:

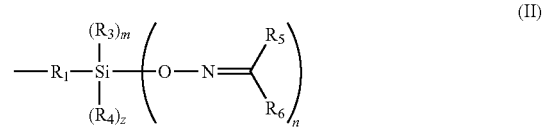

where D is selected from a $C_1$ to $C_{60}$ hydrocarbyl group, or when A is 0 or 1 a hydrogen, or the structure in Formula III;

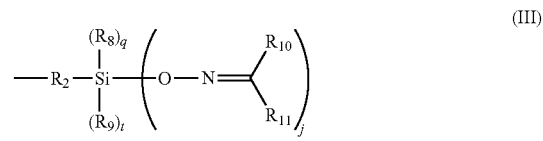

and wherein n and j are independently 1, 2, or 3, m and q are independently 0 or 1, z and t are independently 0 or 1 and (n+m+z) is equal to 3 and (j+q+t) is equal to 3; A is 0 or greater than or equal to 1; $R_1$ and $R_2$ are independently $C_1$ to $C_{60}$ divalent organic groups and may optionally include O, N S, Si, and/or P heteroatoms with the proviso that when A is 0 either of $R_1$ and $R_2$ may be a chemical bond; $R_3$, $R_4$, $R_8$ and $R_9$ are independently a hydrogen, or a $C_1$ to $C_{60}$ hydrocarbyl or alkoxy group optionally including O, N, S, Si and/or P; R5 and R6 are independently hydrogen or $C_1$ to $C_{60}$ hydrocarbyl groups and may optionally include O, N S, Si, and/or P heteroatoms, and may optionally be bonded together to form a cyclic ring; $R_{10}$ and $R_{11}$ are independently hydrogen or $C_1$ to $C_{60}$ hydrocarbyl groups and may optionally include O, N S, Si, and/or P heteroatoms, and may optionally be bonded together to form a cyclic ring.

In another embodiment, a silica reinforcing system includes an inorganic-filler coupling agent, and a ketoximo silane that corresponds to Formula I:

where B is defined as:

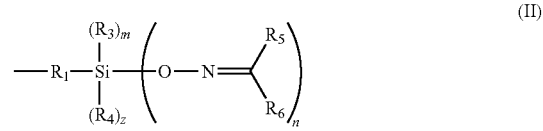

where D is selected from a $C_1$ to $C_{60}$ hydrocarbyl group, or when A is 0 or 1 a hydrogen, or the structure in Formula III;

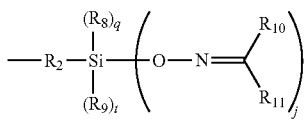  (III)

and wherein n and j are independently 1, 2, or 3, m and q are independently 0 or 1, z and t are independently 0 or 1 and (n+m+z) is equal to 3 and (j+q+t) is equal to 3; A is 0 or greater than or equal to 1; $R_1$ and $R_2$ are independently $C_1$ to $C_{60}$ divalent organic groups and may optionally include O, N S, Si, and/or P heteroatoms with the proviso that when A is 0 either of $R_1$ and $R_2$ may be a chemical bond; $R_3$, $R_4$, $R_8$ and $R_9$ are independently a hydrogen or a $C_1$ to $C_{60}$ hydrocarbyl or alkoxy group optionally including O, N, S, Si and/or P; R5 and R6 are independently hydrogen or $C_1$ to $C_{60}$ hydrocarbyl groups and may optionally include O, N S, Si, and/or P heteroatoms, and may optionally be bonded together to form a cyclic ring; $R_{10}$ and $R_{11}$ are independently hydrogen or $C_1$ to $C_{60}$ hydrocarbyl groups and may optionally include O, N S, Si, and/or P heteroatoms, and may optionally be bonded together to form a cyclic ring. The ketoximo silane is present in an amount of about 0.1 to about 200% by weight relative to the inorganic-filler coupling agent.

In another embodiment, a coated filler includes an inorganic filler and a ketoximo silane. The inorganic filler is coated by the ketoximo silane corresponding to Formula I:

$$D-S_A-B \qquad (I)$$

where B is defined as:

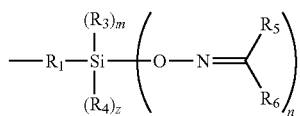  (II)

where D is selected from a $C_1$ to $C_{60}$ hydrocarbyl group, or when A is 0 or 1 a hydrogen, or the structure in Formula III;

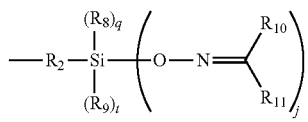  (III)

and wherein n and j are independently 1, 2, or 3, m and q are independently 0 or 1, z and t are independently 0 or 1 and (n+m+z) is equal to 3 and (j+q+t) is equal to 3; A is 0 or greater than or equal to 1; $R_1$ and $R_2$ are independently $C_1$ to $C_{60}$ divalent organic groups and may optionally include O, N S, Si, and/or P heteroatoms with the proviso that when A is 0 either of $R_1$ and $R_2$ may be a chemical bond; $R_3$, $R_4$, $R_8$ and $R_9$ are independently a hydrogen, or a $C_1$ to $C_{60}$ hydrocarbyl or alkoxy group optionally including O, N, S, Si and/or P; R5 and R6 are independently hydrogen or $C_1$ to $C_{60}$ hydrocarbyl groups and may optionally include O, N S, Si, and/or P heteroatoms, and may optionally be bonded together to form a cyclic ring; $R_{10}$ and $R_{11}$ are independently hydrogen or $C_1$ to $C_{60}$ hydrocarbyl groups and may optionally include O, N S, Si, and/or P heteroatoms, and may optionally be bonded together to form a cyclic ring.

In another embodiment, a method includes mixing an elastomer and a ketoximo silane corresponding to Formula I:

$$D-S_A-B \qquad (I)$$

where B is defined as:

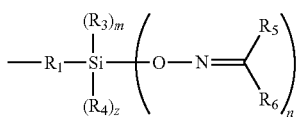  (II)

where D is selected from a $C_1$ to $C_{60}$ hydrocarbyl group, or when A is 0 or 1 a hydrogen, or the structure in Formula III;

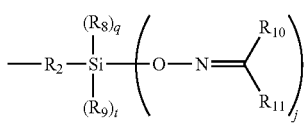  (III)

and wherein n and j are independently 1, 2, or 3, m and q are independently 0 or 1, z and t are independently 0 or 1 and (n+m+z) is equal to 3 and (j+q+t) is equal to 3; A is 0 or greater than or equal to 1; $R_1$ and $R_2$ are independently $C_1$ to $C_{60}$ divalent organic groups and may optionally include O, N S, Si, and/or P heteroatoms with the proviso that when A is 0 either of $R_1$ and $R_2$ may be a chemical bond; $R_3$, $R_4$, $R_8$ and $R_9$ are independently a hydrogen, or a $C_1$ to $C_{60}$ hydrocarbyl or alkoxy group optionally including O, N, S, Si and/or P; R5 and R6 are independently hydrogen or $C_1$ to $C_{60}$ hydrocarbyl groups and may optionally include O, N S, Si, and/or P heteroatoms, and may optionally be bonded together to form a cyclic ring; $R_{10}$ and $R_{11}$ are independently hydrogen or $C_1$ to $C_{60}$ hydrocarbyl groups and may optionally include O, N S, Si, and/or P heteroatoms, and may optionally be bonded together to form a cyclic ring; and an inorganic filler. An elastomeric composition is thereby formed.

In another embodiment, a ketoximo silane shielding and coupling agent includes a ketoximo silane of the following formula (IV):

  (IV)

wherein n, m, z, k, $R_3$, $R_4$, $R_5$ and $R_6$ are as described above, and $R_7$ is a hydrogen, $C_1$ to $C_{60}$ hydrocarbyl groups optionally including O, N S, Si, and/or P heteroatoms, with the proviso that $R_7$ is H only when A is equal to 1.

In an embodiment, a vulcanizable rubber composition includes a diene elastomer, a reinforcing filler, a ketoxime additive of Formula V:

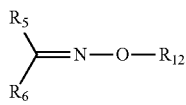  (V)

wherein $R_5$ and $R_6$ are as described above, and $R_{12}$ is a hydrogen, a C1-60 saturated or unsaturated alkyl group and may optionally include O, N, S and/or P heteroatoms, or $R_{12}$ has the structure in Formula VI:

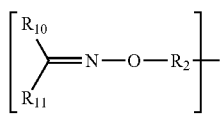

wherein $R_2$, $R_{10}$ and $R_{11}$ are as described above.

In an embodiment, a method for making a composition includes, the steps of: (a) mixing together at a temperature of about 130° C. to about 200° C., in the absence of added cure agents, an elastomer and carbon black, (b) allowing the resulting compound to cool below the mixing temperature of step (a); and (c) mixing the resulting compound with cure agents including an accelerator, the accelerator comprising a compound having an oxime, ketoxime, or ketoximo silane moiety, at a temperature of less than about 120° C.

DETAILED DESCRIPTION

Figure 1:
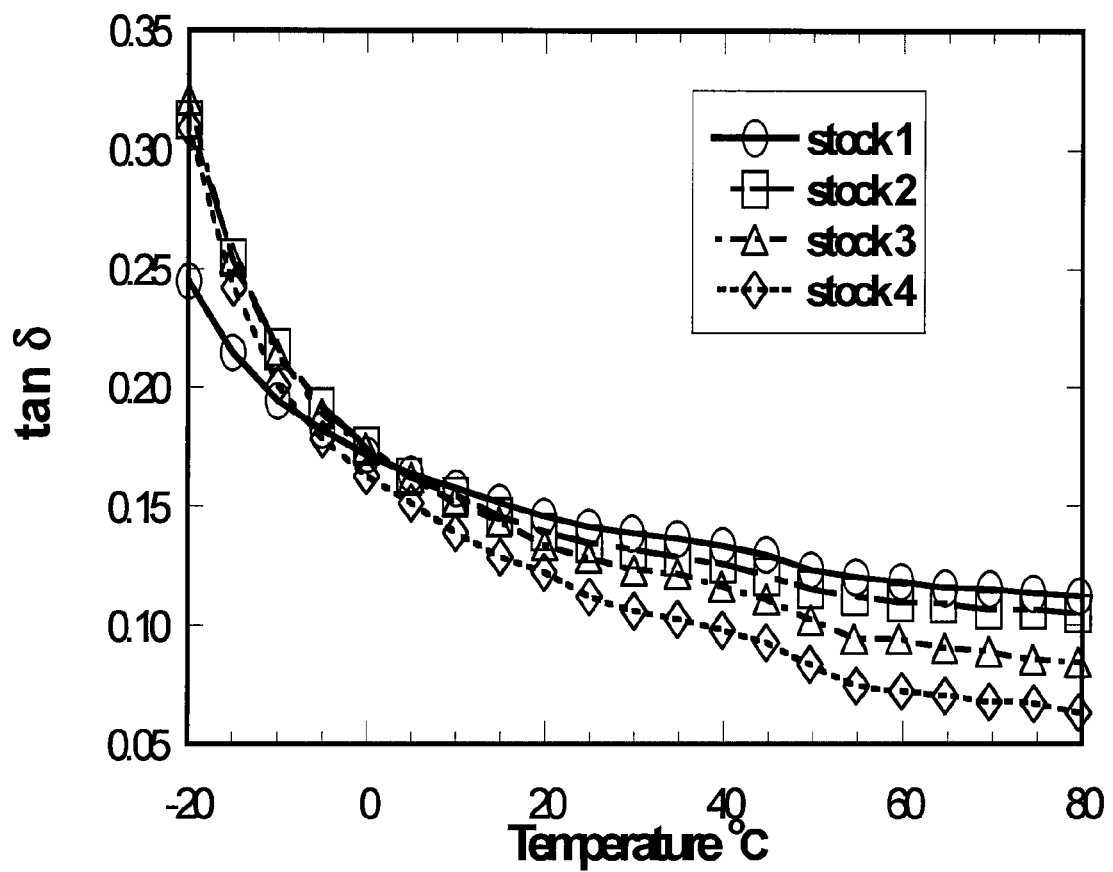
FIG. 1 is graph of tan delta values obtained by a temperature sweep of Examples 6-9 (corresponding to stocks 1-4).

Surprisingly, it was discovered that ketoximo silanes that produce little or no VOCs are a suitable replacement for silica dispersing agents that produce VOCs. Furthermore, it was found that both ketoximo silanes and ketoximes enhance certain properties of rubber compositions.

In an embodiment, a ketoximo silane additive has the general formula (I):

where B defined as:

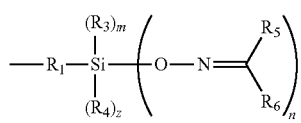

where D is selected from a $C_1$ to $C_{60}$ hydrocarbyl group, or when A is 0 or 1 a hydrogen, or the structure in Formula III;

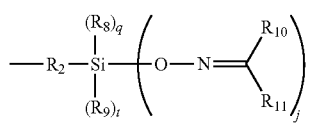

and wherein n and j are independently 1, 2, or 3, m and q are independently 0 or 1, z and t are independently 0 or 1 and (n+m+z) is equal to 3 and (j+q+t) is equal to 3; A is 0 or greater than or equal to 1; $R_1$ and $R_2$ are independently $C_1$ to $C_{60}$ divalent organic groups and may optionally include O, N S, Si, and/or P heteroatoms with the proviso that when A is 0 either of $R_1$ and $R_2$ may be a chemical bond; $R_3$, $R_4$, $R_8$ and $R_9$ are independently a hydrogen, or a $C_1$ to $C_{60}$ hydrocarbyl or alkoxy group optionally including O, N, S, Si and/or P; R5 and R6 are independently hydrogen or $C_1$ to $C_{60}$ hydrocarbyl groups and may optionally include O, N S, Si, and/or P heteroatoms, and may optionally be bonded together to form a cyclic ring; $R_{10}$ and $R_{11}$ are independently hydrogen or $C_1$ to $C_{60}$ hydrocarbyl groups and may optionally include O, N S, Si, and/or P heteroatoms, and may optionally be bonded together to form a cyclic ring. In an embodiment, the inorganic filler reacts with the ketoximo silane.

In one or more embodiments, divalent organic groups may include a hydrocarbylene group or substituted hydrocarbylene group such as but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to 20 carbon atoms. Substituted hydrocarbylene groups include a hydrocarbylene group in which one or more hydrogen atoms have been replaced by a substituent such as an alkyl group.

In certain embodiments, the ketoximo silanes are monoketoximo silanes represented by Formula IV:

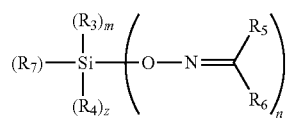

wherein n is 1, 2, or 3, m is 0 or 1, z is 0 or 1 and (n+m+z) is equal to 3; $R_3$ and $R_4$ are independently a hydrogen, or a $C_1$ to $C_{60}$ hydrocarbyl or alkoxy group optionally including O, N, S, Si and/or P; R5 and R6 are independently a hydrogen, a $C_1$ to $C_{60}$ hydrocarbyl group, optionally including O, N, S, Si, and/or P heteroatoms, and may optionally together form a cyclic ring; and $R_7$ is a hydrogen, a $C_1$ to $C_{60}$ hydrocarbyl group, optionally including O, N, S, Si, and/or P heteroatoms, with the proviso that $R_7$ is H only when A is equal to 1.

Further examples of monoketoximo silanes include, but are not limited to, trihydrocarbyl(dihydrocarbylketoximo)silane, dihydrocarbyl-bis-(dihydrocarbylketoximo)silane, hydrocarbyl-tris-(dihydrocarbylketoximo)silane, trihydrocarbyl(cycloalkylketoximo)silane, dihydrocarbyl-bis-(cycloalkylketoximo)silane, hydrocarbyl-tris-(cycloalkylketoximo)silane, trialkyl(cycloalkylketoximo)silane, dialkyl-bis-(cycloalkylketoximo)silane, alkyl-tris-(cylcoalkylketoximo)silane, trialkyl(dialkylketoximo)silane, dialkyl-bis-(dialkylketoximo)silane, alkyl-tris-(dialkylketoximo)silane, triaryl(diarylketoximo)silane, diaryl-bis-(diarylketoximo)silane, arly-tris-(diarylketoximo)silane, triaryl(dialkylketoximo)silane, diaryl-bis-(dialkylketoximo)silane, aryl-tris-(dialkylketoximo)silane, triaryl(cyclohexylketoximo)silane, diaryl-bis-(cyclohexylketoximo)silane and aryl-tris-(cyclohexylketoximo)silane.

Examples of trialkyl(cycloalkylketoximo)silanes include octadecyldimethyl(cyclohexylketoximo)silane, dodecyldimethyl(cyclohexylketoximo)silane, undecyldimethyl(cyclohexylketoximo)silane, decyldimethyl(cyclohexylketoximo) silane, nonyldimethyl(cyclohexylketoximo)silane, octyldimethyl(cyclohexylketoximo)silane, heptyldimethyl (cyclohexylketoximo)silane, hexyldimethyl(cyclohexylketoximo)silane, pentyldimethyl(cyclohexylketoximo)silane, butyldimethyl(cyclohexylketoximo)silane, propyldimethyl (cyclohexylketoximo)silane, ethyldimethyl(cyclohexylketoximo)silane, trimethyl(cyclohexylketoximo)silane, octadecyldiethyl(cyclohexylketoximo)silane, dodecyldiethyl(cyclohexylketoximo)silane, undecyldiethyl(cyclohexylketoximo)silane, decyldiethyl(cyclohexylketoximo)silane, nonyldiethyl(cyclohexylketoximo)silane, octyldiethyl(cyclohexylketoximo)silane, heptyldiethyl(cyclohexylketoximo)silane, hexyldiethyl(cyclohexylketoximo)silane, pentyldiethyl(cyclohexylketoximo)silane, butyldiethyl(cyclohexylketoximo)silane, triethyl(cyclohexylketoximo)silane, octadecyldipropyl(cyclohexylketoximo)silane, dodecyldipropyl(cyclohexylketoximo)silane, undecyldipropyl(cyclohexylketoximo)silane, decyldipropyl(cyclohexylketoximo)silane, nonyldipropyl(cyclohexylketoximo)silane, octyldipropyl(cyclohexylketoximo)silane, heptyldipropyl(cyclohexylketoximo)silane, hexyldipropyl(cyclohexylketoximo)silane, pentyldipropyl(cyclohexylketoximo)silane, butyldipropyl(cyclohexylketoximo)silane, ethyldipropyl(cyclohexylketoximo)silane, tripropyl(cyclohexylketoximo)silane, octadecyldibutyl(cyclohexylketoximo)silane, dodecyldibutyl(cyclohexylketoximo)silane, undecyldibutyl(cyclohexylketoximo)silane, decyldibutyl(cyclohexylketoximo)silane, nonyldibutyl(cyclohexylketoximo)silane, octyldibutyl(cyclohexylketoximo)silane, heptyldibutyl(cyclohexylketoximo)silane, hexyldibutyl(cyclohexylketoximo)silane, pentyldibutyl(cyclohexylketoximo)silane, propyldibutyl(cyclohexylketoximo)silane, ethyldibutyl(cyclohexylketoximo)silane, tributyl(cyclohexylketoximo)silane octadecyldimethyl(cyclopentylketoximo)silane, dodecyldimethyl(cyclopentylketoximo)silane, undecyldimethyl(cyclopentylketoximo)silane, decyldimethyl(cyclopentylketoximo)silane, nonyldimethyl(cyclopentylketoximo)silane, octyldimethyl(cyclopentylketoximo)silane, heptyldimethyl(cyclopentylketoximo)silane, hexyldimethyl(cyclopentylketoximo)silane, pentyldimethyl(cyclopentylketoximo)silane, butyldimethyl(cyclopentylketoximo)silane, propyldimethyl(cyclopentylketoximo)silane, ethyldimethyl(cyclopentylketoximo)silane, trimethyl(cyclopentylketoximo)silane, octadecyldiethyl(cyclopentylketoximo)silane, dodecyldiethyl(cyclopentylketoximo)silane, undecyldiethyl(cyclopentylketoximo)silane, decyldiethyl(cyclopentylketoximo)silane, nonyldiethyl(cyclopentylketoximo)silane, octyldiethyl(cyclopentylketoximo)silane, heptyldiethyl(cyclopentylketoximo)silane, hexyldiethyl(cyclopentylketoximo)silane, pentyldiethyl(cyclopentylketoximo)silane, butyldiethyl(cyclopentylketoximo)silane, triethyl(cyclopentylketoximo)silane, octadecyldipropyl(cyclopentylketoximo)silane, dodecyldipropyl(cyclopentylketoximo)silane, undecyldipropyl(cyclopentylketoximo)silane, decyldipropyl(cyclopentylketoximo)silane, nonyldipropyl(cyclopentylketoximo)silane, octyldipropyl(cyclopentylketoximo)silane, heptyldipropyl(cyclopentylketoximo)silane, hexyldipropyl(cyclopentylketoximo)silane, pentyldipropyl(cyclopentylketoximo)silane, butyldipropyl(cyclopentylketoximo)silane, ethyldipropyl(cyclopentylketoximo)silane, tripropyl(cyclopentylketoximo)silane, octadecyldibutyl(cyclopentylketoximo)silane, dodecyldibutyl(cyclopentylketoximo)silane, undecyldibutyl(cyclopentylketoximo)silane, decyldibutyl(cyclopentylketoximo)silane, nonyldibutyl(cyclopentylketoximo)silane, octyldibutyl(cyclopentylketoximo)silane, heptyldibutyl(cyclopentylketoximo)silane, hexyldibutyl(cyclopentylketoximo)silane, pentyldibutyl(cyclopentylketoximo)silane, propyldibutyl(cyclopentylketoximo)silane, ethyldibutyl(cyclopentylketoximo)silane and tributyl(cyclopentylketoximo)silane.

Examples of dialkyl-bis-(cycloalkylketoximo)silanes include octadecylmethyl-bis-(cyclohexylketoximo)silane, dodecylmethyl-bis-(cyclohexylketoximo)silane, undecylmethyl-bis-(cyclohexylketoximo)silane, decylmethyl-bis-(cyclohexylketoximo)silane, nonylmethyl-bis-(cyclohexylketoximo)silane, octylmethyl-bis-(cyclohexylketoximo)silane, heptylmethyl-bis-(cyclohexylketoximo)silane, hexylmethyl-bis-(cyclohexylketoximo)silane, pentylmethyl-bis-(cyclohexylketoximo)silane, butylmethyl-bis-(cyclohexylketoximo)silane, propylmethyl-bis-(cyclohexylketoximo)silane, ethylmethyl-bis-(cyclohexylketoximo)silane, dimethyl-bis-(cyclohexylketoximo)silane, octadecylethyl-bis-(cyclohexylketoximo)silane, dodecylethyl-bis-(cyclohexylketoximo)silane, undecylethyl-bis-(cyclohexylketoximo)silane, decylethyl-bis-(cyclohexylketoximo)silane, nonylethyl-bis-(cyclohexylketoximo)silane, octylethyl-bis-(cyclohexylketoximo)silane, heptylethyl-bis-(cyclohexylketoximo)silane, hexylethyl-bis-(cyclohexylketoximo)silane, pentylethyl-bis-(cyclohexylketoximo)silane, butylethyl-bis-(cyclohexylketoximo)silane, diethyl-bis-(cyclohexylketoximo)silane, octadecylpropyl-bis-(cyclohexylketoximo)silane, dodecylpropyl-bis-(cyclohexylketoximo)silane, undecylpropyl-bis-(cyclohexylketoximo)silane, decylpropyl-bis-(cyclohexylketoximo)silane, nonylpropyl-bis-(cyclohexylketoximo)silane, octylpropyl-bis-(cyclohexylketoximo)silane, heptylpropyl-bis-(cyclohexylketoximo)silane, hexylpropyl-bis-(cyclohexylketoximo)silane, pentylpropyl-bis-(cyclohexylketoximo)silane, butylpropyl-bis-(cyclohexylketoximo)silane, ethylpropyl-bis-(cyclohexylketoximo)silane, dipropyl-bis-(cyclohexylketoximo)silane, octadecylbutyl-bis-(cyclohexylketoximo)silane, dodecylbutyl-bis-(cyclohexylketoximo)silane, undecylbutyl-bis-(cyclohexylketoximo)silane, decylbutyl-bis-(cyclohexylketoximo)silane, nonylbutyl-bis-(cyclohexylketoximo)silane, octylbutyl-bis-(cyclohexylketoximo)silane, heptylbutyl-bis-(cyclohexylketoximo)silane, hexylbutyl-bis-(cyclohexylketoximo)silane, pentylbutyl-bis-(cyclohexylketoximo)silane, propylbutyl-bis-(cyclohexylketoximo)silane, ethylbutyl-bis-(cyclohexylketoximo)silane, dibutyl-bis-(cyclohexylketoximo)silane, octadecylmethyl-bis-(cyclopentylketoximo)silane, dodecylmethyl-bis-(cyclopentylketoximo)silane, undecylmethyl-bis-(cyclopentylketoximo)silane, decylmethyl-bis-(cyclopentylketoximo)silane, nonylmethyl-bis-(cyclopentylketoximo)silane, octylmethyl-bis-(cyclopentylketoximo)silane, heptylmethyl-bis-(cyclopentylketoximo)silane, hexylmethyl-bis-(cyclopentylketoximo)silane, pentylmethyl-bis-(cyclopentylketoximo)silane, butylmethyl-bis-(cyclopentylketoximo)silane, propylmethyl-bis-(cyclopentylketoximo)silane, ethylmethyl-bis-(cyclopentylketoximo)silane, dimethyl-bis-(cyclopentylketoximo)silane, octadecylethyl-bis-(cyclopentylketoximo)silane, dodecylethyl-bis-(cyclopentylketoximo)silane, undecylethyl-bis-(cyclopentylketoximo)silane, decylethyl-bis-(cyclopentylketoximo)silane, nonylethyl-bis-(cyclopentylketoximo)silane, octylethyl-bis-(cyclopentylketoximo)silane, heptylethyl-bis-(cyclopentylketoximo)silane, hexylethyl-bis-(cyclopentylketoximo)silane, pentylethyl-bis-(cyclopentylketoximo)silane, butylethyl-bis-(cyclopentylketoximo)silane, diethyl-bis-(cyclopentylketoximo)silane, octadecylpropyl-bis-(cyclopentylketoximo)silane, dodecylpropyl-bis-(cyclopentylketoximo)silane, undecylpropyl-bis-(cyclopentylketoximo)silane, decylpropyl-bis-(cyclopentylketoximo)silane, nonylpropyl-bis-(cyclopentylketoximo)silane, octylpropyl-bis-(cyclopentylketoximo)silane, heptylpropyl-bis-(cyclopentylketoximo)silane, hexylpropyl-bis-(cyclopentylketoximo)silane, pentylpropyl-bis-(cyclopentylketoximo)silane, butylpropyl-bis-(cyclopentylketoximo)silane, ethylpropyl-bis-(cyclopentylketoximo)silane, dipropyl-bis-(cyclopentylketoximo)silane, octadecylbutyl-bis-(cyclopentylketoximo)silane, dodecylbutyl-bis-(cyclopentylketoximo)silane, undecylbutyl-bis-(cyclopentylketoximo)silane, decylbutyl-bis-(cyclopentylketoximo)silane, nonylbutyl-bis-(cyclopentylketoximo)silane, octylbutyl-bis-(cyclopentylketoximo)silane, heptylbutyl-bis-(cyclopentylketoximo)silane, hexylbutyl-bis-(cyclopentylketoximo)silane, pentylbutyl-bis-(cyclopentylketoximo)silane, propylbutyl-bis-(cyclopentylketoximo)silane, ethylbutyl-bis-(cyclopentylketoximo)silane and dibutyl-bis-(cyclopentylketoximo)silane.

Examples of alkyl-tris-(cycloalkylketoximo)silanes include octadecyl-tris-(cyclohexylketoximo)silane, dodecyl-tris-(cyclohexylketoximo)silane, undecyl-tris-(cyclohexylketoximo)silane, decyl-tris-(cyclohexylketoximo)silane, nonyl-tris-(cyclohexylketoximo)silane, octyl-tris-(cyclohexylketoximo)silane, heptyl-tris-(cyclohexylketoximo)silane, hexyl-tris-(cyclohexylketoximo)silane, pentyl-tris-(cyclohexylketoximo)silane, butyl-tris-(cyclohexylketoximo)silane, propyl-tris-(cyclohexylketoximo)silane, ethyl-tris-(cyclohexylketoximo)silane, methyl-tris-(cyclohexylketoximo)silane, octadecyl-tris-(cyclopentylketoximo)silane, dodecyl-tris-(cyclopentylketoximo)silane, undecyl-tris-(cyclopentylketoximo)silane, decyl-tris-(cyclopentylketoximo)silane, nonyl-tris-(cyclopentylketoximo)silane, octyl-tris-(cyclopentylketoximo)silane, heptyl-tris-(cyclopentylketoximo)silane, hexyl-tris-(cyclopentylketoximo)silane, pentyl-tris-(cyclopentylketoximo)silane, butyl-tris-(cyclopentylketoximo)silane, propyl-tris-(cyclopentylketoximo)silane, ethyl-tris-(cyclopentylketoximo)silane and methyl-tris-(cyclopentylketoximo)silane.

Examples of trialkyl(dialkylketoximo)silanes include octadecyldimethyl(methylethylketoximo)silane, dodecyldimethyl(methylethylketoximo)silane, undecyldimethyl(methylethylketoximo)silane, decyldimethyl(methylethylketoximo)silane, nonyldimethyl(methylethylketoximo)silane, octyldimethyl(methylethylketoximo)silane, heptyldimethyl(methylethylketoximo)silane, hexyldimethyl(methylethylketoximo)silane, pentyldimethyl(methylethylketoximo)silane, butyldimethyl(methylethylketoximo)silane, propyldimethyl(methylethylketoximo)silane, ethyldimethyl(methylethylketoximo)silane, trimethyl(methylethylketoximo)silane, octadecyldiethyl(methylethylketoximo)silane, dodecyldiethyl(methylethylketoximo)silane, undecyldiethyl(methylethylketoximo)silane, decyldiethyl(methylethylketoximo)silane, nonyldiethyl(methylethylketoximo)silane, octyldiethyl(methylethylketoximo)silane, heptyldiethyl(methylethylketoximo)silane, hexyldiethyl(methylethylketoximo)silane, pentyldiethyl(methylethylketoximo)silane, butyldiethyl(methylethylketoximo)silane, triethyl(methylethylketoximo)silane, octadecyldipropyl(methylethylketoximo)silane, dodecyldipropyl(methylethylketoximo)silane, undecyldipropyl(methylethylketoximo)silane, decyldipropyl(methylethylketoximo)silane, nonyldipropyl(methylethylketoximo)silane, octyldipropyl(methylethylketoximo)silane, heptyldipropyl(methylethylketoximo)silane, hexyldipropyl(methylethylketoximo)silane, pentyldipropyl(methylethylketoximo)silane, butyldipropyl(methylethylketoximo)silane, ethyldipropyl(methylethylketoximo)silane, tripropyl(methylethylketoximo)silane, octadecyldibutyl(methylethylketoximo)silane, dodecyldibutyl(methylethylketoximo)silane, undecyldibutyl(methylethylketoximo)silane, decyldibutyl(methylethylketoximo)silane, nonyldibutyl(methylethylketoximo)silane, octyldibutyl(methylethylketoximo)silane, heptyldibutyl(methylethylketoximo)silane, hexyldibutyl(methylethylketoximo)silane, pentyldibutyl(methylethylketoximo)silane, propyldibutyl(methylethylketoximo)silane, ethyldibutyl(methylethylketoximo)silane, tributyl(methylethylketoximo)silane, octadecyldimethyl(dimethylketoximo)silane, dodecyldimethyl(dimethylketoximo)silane, undecyldimethyl(dimethylketoximo)silane, decyldimethyl(dimethylketoximo)silane, nonyldimethyl(dimethylketoximo)silane, octyldimethyl(dimethylketoximo)silane, heptyldimethyl(dimethylketoximo)silane, hexyldimethyl(dimethylketoximo)silane, pentyldimethyl(dimethylketoximo)silane, butyldimethyl(dimethylketoximo)silane, propyldimethyl(dimethylketoximo)silane, ethyldimethyl(dimethylketoximo)silane, trimethyl(dimethylketoximo)silane, octadecyldiethyl(dimethylketoximo)silane, dodecyldiethyl(dimethylketoximo)silane, undecyldiethyl(dimethylketoximo)silane, decyldiethyl(dimethylketoximo)silane, nonyldiethyl(dimethylketoximo)silane, octyldiethyl(dimethylketoximo)silane, heptyldiethyl(dimethylketoximo)silane, hexyldiethyl(dimethylketoximo)silane, pentyldiethyl(dimethylketoximo)silane, butyldiethyl(dimethylketoximo)silane, triethyl(dimethylketoximo)silane, octadecyldipropyl(dimethylketoximo)silane, dodecyldipropyl(dimethylketoximo)silane, undecyldipropyl(dimethylketoximo)silane, decyldipropyl(dimethylketoximo)silane, nonyldipropyl(dimethylketoximo)silane, octyldipropyl(dimethylketoximo)silane, heptyldipropyl(dimethylketoximo)silane, hexyldipropyl(dimethylketoximo)silane, pentyldipropyl(dimethylketoximo)silane, butyldipropyl(dimethylketoximo)silane, ethyldipropyl(dimethylketoximo)silane, tripropyl(dimethylketoximo)silane, octadecyldibutyl(dimethylketoximo)silane, dodecyldibutyl(dimethylketoximo)silane, undecyldibutyl(dimethylketoximo)silane, decyldibutyl(dimethylketoximo)silane, nonyldibutyl(dimethylketoximo)silane, octyldibutyl(dimethylketoximo)silane, heptyldibutyl(dimethylketoximo)silane, hexyldibutyl(dimethylketoximo)silane, pentyldibutyl(dimethylketoximo)silane, propyldibutyl(dimethylketoximo)silane, ethyldibutyl(dimethylketoximo)silane, tributyl(dimethylketoximo)silane, octadecyldimethyl(methylpropylketoximo)silane, dodecyldimethyl(methylpropylketoximo)silane, undecyldimethyl(methylpropylketoximo)silane, decyldimethyl(methylpropylketoximo)silane, nonyldimethyl(methylpropylketoximo)silane, octyldimethyl(methylpropylketoximo)silane, heptyldimethyl(methylpropylketoximo)silane, hexyldimethyl(methylpropylketoximo)silane, pentyldimethyl(methylpropylketoximo)silane, butyldimethyl(methylpropylketoximo)silane, propyldimethyl(methylpropylketoximo)silane, ethyldimethyl(methylpropylketoximo)silane, trimethyl(methylpropylketoximo)silane, octadecyldiethyl(methylpropylketoximo)silane, dodecyldiethyl(methylpropylketoximo)silane, undecyldiethyl(methylpropylketoximo)silane, decyldiethyl(methylpropylketoximo)silane, nonyldiethyl(methylpropylketoximo)silane, octyldiethyl(methylpropylketoximo)silane, heptyldiethyl(methylpropylketoximo)silane, hexyldiethyl(methylpropylketoximo)silane, pentyldiethyl(methylpropylketoximo)silane, butyldiethyl(methylpropylketoximo)silane, triethyl(methylpropylketoximo)silane, octadecyldipropyl(methylpropylketoximo)silane, dodecyldipropyl(methylpropylketoximo)silane, undecyldipropyl(methylpropylketoximo)silane, decyldipropyl(methylpropylketoximo)silane, nonyldipropyl(methylpropylketoximo)silane, octyldipropyl(methylpropylketoximo)silane, heptyldipropyl(methylpropylketoximo)silane, hexyldipropyl(methylpropylketoximo)silane, pentyldipropyl(methylpropylketoximo)silane, butyldipropyl(methylpropylketoximo)silane, ethyldipropyl(methylpropylketoximo)silane, tripropyl(methylpropylketoximo)silane, octadecyldibutyl(methylpropylketoximo)silane, dodecyldibutyl(methylpropylketoximo)silane, undecyldibutyl(methylpropylketoximo)silane, decyldibutyl(methylpropylketoximo)silane, nonyldibutyl(methylpropylketoximo)silane, octyldibutyl(methylpropylketoximo)silane, heptyldibutyl(methylpropylketoximo)silane, hexyldibutyl(methylpropylketoximo)silane, pentyldibutyl(methylpropylketoximo)silane, propyldibutyl(methylpropylketoximo)silane and ethyldibutyl(methylpropylketoximo)silane, tributyl(methylpropylketoximo)silane.

Examples of dialkyl-bis-(dialkylketoximo)silanes include octadecylmethyl-bis-(methylethylketoximo)silane, dodecylmethyl-bis-(methylethylketoximo)silane, undecylmethyl-bis-(methylethylketoximo)silane, decylmethyl-bis-(methylethylketoximo)silane, nonylmethyl-bis-(methylethylketoximo)silane, octylmethyl-bis-(methylethylketoximo)silane, heptylmethyl-bis-(methylethylketoximo)silane, hexylmethyl-bis-(methylethylketoximo)silane, pentylmethyl-bis-(methylethylketoximo)silane, butylmethyl-bis-(methylethylketoximo)silane, propylmethyl-bis-(methylethylketoximo)silane, ethylmethyl-bis-(methylethylketoximo)silane, dimethyl-bis-(methylethylketoximo)silane, octadecylethyl-bis-(methylethylketoximo)silane, dodecylethyl-bis-(methylethylketoximo)silane, undecylethyl-bis-(methylethylketoximo)silane, decylethyl-bis-(methylethylketoximo)silane, nonylethyl-bis-(methylethylketoximo)silane, octylethyl-bis-(methylethylketoximo)silane, heptylethyl-bis-(methylethylketoximo)silane, hexylethyl-bis-(methylethylketoximo)silane, pentylethyl-bis-(methylethylketoximo)silane, butylethyl-bis-(methylethylketoximo)silane, diethyl-bis-(methylethylketoximo)silane, octadecylpropyl-bis-(methylethylketoximo)silane, dodecylpropyl-bis-(methylethylketoximo)silane, undecylpropyl-bis-(methylethylketoximo)silane, decylpropyl-bis-(methylethylketoximo)silane, nonylpropyl-bis-(methylethylketoximo)silane, octylpropyl-bis-(methylethylketoximo)silane, heptylpropyl-bis-(methylethylketoximo)silane, hexylpropyl-bis-(methylethylketoximo)silane, pentylpropyl-bis-(methylethylketoximo)silane, butylpropyl-bis-(methylethylketoximo)silane, ethylpropyl-bis-(methylethylketoximo)silane, dipropyl-bis-(methylethylketoximo)silane, octadecylbutyl-bis-(methylethylketoximo)silane, dodecylbutyl-bis-(methylethylketoximo)silane, undecylbutyl-bis-(methylethylketoximo)silane, decylbutyl-bis-(methylethylketoximo)silane, nonylbutyl-bis-(methylethylketoximo)silane, octylbutyl-bis-(methylethylketoximo)silane, heptylbutyl-bis-(methylethylketoximo)silane, hexylbutyl-bis-(methylethylketoximo)silane, pentylbutyl-bis-(methylethylketoximo)silane, propylbutyl-bis-(methylethylketoximo)silane, ethylbutyl-bis-(methylethylketoximo)silane, dibutyl-bis-(methylethylketoximo)silane, octadecylmethyl-bis-(dimethylketoximo)silane, dodecylmethyl-bis-(dimethylketoximo)silane, undecylmethyl-bis-(dimethylketoximo)silane, decylmethyl-bis-(dimethylketoximo)silane, nonylmethyl-bis-(dimethylketoximo)silane, octylmethyl-bis-(dimethylketoximo)silane, heptylmethyl-bis-(dimethylketoximo)silane, hexylmethyl-bis-(dimethylketoximo)silane, pentylmethyl-bis-(dimethylketoximo)silane, butylmethyl-bis-(dimethylketoximo)silane, propylmethyl-bis-(dimethylketoximo)silane, ethylmethyl-bis-(dimethylketoximo)silane, dimethyl-bis-(dimethylketoximo)silane, octadecylethyl-bis-(dimethylketoximo)silane, dodecylethyl-bis-(dimethylketoximo)silane, undecylethyl-bis-(dimethylketoximo)silane, decylethyl-bis-(dimethylketoximo)silane, nonylethyl-bis-(dimethylketoximo)silane, octylethyl-bis-(dimethylketoximo)silane, heptylethyl-bis-(dimethylketoximo)silane, hexylethyl-bis-(dimethylketoximo)silane, pentylethyl-bis-(dimethylketoximo)silane, butylethyl-bis-(dimethylketoximo)silane, diethyl-bis-(dimethylketoximo)silane, octadecylpropyl-bis-(dimethylketoximo)silane, dodecylpropyl-bis-(dimethylketoximo)silane, undecylpropyl-bis-(dimethylketoximo)silane, decylpropyl-bis-(dimethylketoximo)silane, nonylpropyl-bis-(dimethylketoximo)silane, octylpropyl-bis-(dimethylketoximo)silane, heptylpropyl-bis-(dimethylketoximo)silane, hexylpropyl-bis-(dimethylketoximo)silane, pentylpropyl-bis-(dimethylketoximo)silane, butylpropyl-bis-(dimethylketoximo)silane, ethylpropyl-bis-(dimethylketoximo)silane, dipropyl-bis-(dimethylketoximo)silane, octadecylbutyl-bis-(dimethylketoximo)silane, dodecylbutyl-bis-(dimethylketoximo)silane, undecylbutyl-bis-(dimethylketoximo)silane, decylbutyl-bis-(dimethylketoximo)silane, nonylbutyl-bis-(dimethylketoximo)silane, octylbutyl-bis-(dimethylketoximo)silane, heptylbutyl-bis-(dimethylketoximo)silane, hexylbutyl-bis-(dimethylketoximo)silane, pentylbutyl-bis-(dimethylketoximo)silane, propylbutyl-bis-(dimethylketoximo)silane, ethylbutyl-bis-(dimethylketoximo)silane and dibutyl-bis-(dimethylketoximo)silane.

Examples of alkyl-tris-(dialkylketoximo)silanes include octadecyl-tris-(ethylmethylketoximo)silane, dodecyl-tris-(ethylmethylketoximo)silane, undecyl-tris-(ethylmethylketoximo)silane, decyl-tris-(ethylmethylketoximo)silane, nonyl-tris-(ethylmethylketoximo)silane, octyl-tris-(ethylmethylketoximo)silane, heptyl-tris-(ethylmethylketoximo)silane, hexyl-tris-(ethylmethylketoximo)silane, pentyl-tris-(ethylmethylketoximo)silane, butyl-tris-(ethylmethylketoximo)silane, propyl-tris-(ethylmethylketoximo)silane, ethyl-tris-(ethylmethylketoximo)silane, methyl-tris-(ethylmethylketoximo)silane, octadecyl-tris- (dimethylketoximo)silane, dodecyl-tris-(dimethylketoximo)silane, undecyl-tris-(dimethylketoximo)silane, decyl-tris-(dimethylketoximo)silane, nonyl-tris-(dimethylketoximo)silane, octyl-tris-(dimethylketoximo)silane, heptyl-tris-(dimethylketoximo)silane, hexyl-tris-(dimethylketoximo)silane, pentyl-tris-(dimethylketoximo)silane, butyl-tris-(dimethylketoximo)silane, propyl-tris-(dimethylketoximo)silane, ethyl-tris-(dimethylketoximo)silane and methyl-tris-(dimethylketoximo)silane.

Examples of triaryl(dialkylketoximo)silanes include triphenyl(methylethylketoximo)silane, trinaphthyl(methylethylketoximo)silane, triphenyl(dimethylketoximo)silane, trinaphthyl(dimethylketoximo)silane, triphenyl(methylpropylketoximo)silane and trinaphthyl(methylpropylketoximo)silane.

Examples of triaryl(diarylketoximo)silanes include triphenyl(diphenylketoximo)silane, trinaphthyl(diphenylketoximo)silane and triphenyl(dinaphthylketoximo)silane.

Examples of trialkyl(diarylketoximo)silanes include octadecyldimethyl(diphenylketoximo)silane, dodecyldimethyl(diphenylketoximo)silane, undecyldimethyl(diphenylketoximo)silane, decyldimethyl(diphenylketoximo)silane, Nonyldimethyl(diphenylketoximo)silane, octyldimethyl(diphenylketoximo)silane, heptyldimethyl(diphenylketoximo)silane, hexyldimethyl(diphenylketoximo)silane, pentyldimethyl(diphenylketoximo)silane, butyldimethyl(diphenylketoximo)silane, propyldimethyl(diphenylketoximo)silane, ethyldimethyl(diphenylketoximo)silane, trimethyl(diphenylketoximo)silane, octadecyldiethyl(diphenylketoximo)silane, dodecyldiethyl(diphenylketoximo)silane, undecyldiethyl(diphenylketoximo)silane, decyldiethyl(diphenylketoximo)silane, nonyldiethyl(diphenylketoximo)silane, octyldiethyl(diphenylketoximo)silane, heptyldiethyl(diphenylketoximo)silane, hexyldiethyl(diphenylketoximo)silane, pentyldiethyl(diphenylketoximo)silane, butyldiethyl(diphenylketoximo)silane, triethyl(diphenylketoximo)silane, octadecyldipropyl(diphenylketoximo)silane, dodecyldipropyl(diphenylketoximo)silane, undecyldipropyl(diphenylketoximo)silane, decyldipropyl(diphenylketoximo)silane, nonyldipropyl(diphenylketoximo)silane, octyldipropyl(diphenylketoximo)silane, heptyldipropyl(diphenylketoximo)silane, hexyldipropyl(diphenylketoximo)silane, pentyldipropyl(diphenylketoximo)silane, butyldipropyl(diphenylketoximo)silane, ethyldipropyl(diphenylketoximo)silane, tripropyl(diphenylketoximo)silane, octadecyldibutyl(diphenylketoximo)silane, dodecyldibutyl(diphenylketoximo)silane, undecyldibutyl(diphenylketoximo)silane, decyldibutyl(diphenylketoximo)silane, nonyldibutyl(diphenylketoximo)silane, octyldibutyl(diphenylketoximo)silane, heptyldibutyl(diphenylketoximo)silane, hexyldibutyl(diphenylketoximo)silane, pentyldibutyl(diphenylketoximo)silane, propyldibutyl(diphenylketoximo)silane, ethyldibutyl(diphenylketoximo)silane and tributyl(diphenylketoximo)silane.

Examples of diaryl-bis-(dialkylketoximo)silanes include diphenyl-bis-(methylethylketoximo)silane, dinaphthyl-bis-(methylethylketoximo)silane, diphenyl-bis-(dimethylketoximo)silane, dinaphthyl-bis-(dimethylketoximo)silane, diphenyl-bis-(methylpropylketoximo)silane and dinaphthyl-bis-(methylpropylketoximo)silane.

Examples of diaryl-bis-(diarylketoximo)silanes include diphenyl-bis-(diphenylketoximo)silane, dinaphthyl-bis-(diphenylketoximo)silane and diphenyl-bis-(dinaphthylketoximo)silane.

Examples of aryl-tris-(dialkylketoximo)silanes include phenyl-tris-(ethylmethylketoximo)silane, naphthyl-tris-(ethylmethylketoximo)silane, phenyl-tris-(dimethylketoximo)silane and naphthyl-tris-(dimethylketoximo)silane.

Examples of triaryl(cycloalkylketoximo)silanes include triphenyl(cyclohexylketoximo)silane, trinaphthyl(cyclopentylketoximo)silane, triphenyl(cyclopentylketoximo)silane and trinaphthyl(cyclohexylketoximo)silane.

Examples of diaryl-bis-(cycloalkylketoximo)silanes include diphenyl-bis-(cyclohexylketoximo)silane, dinaphthyl-bis-(cyclopentylketoximo)silane, diphenyl-bis-(cyclopentylketoximo)silane and dinaphthyl-bis-(cyclohexylketoximo)silane.

Examples of aryl-tris-(cycloalkylketoximo)silanes include phenyl-tris-(cyclohexylketoximo)silane, naphthyl-tris-(cyclohexylketoximo)silane, phenyl-tris-(cyclopentylketoximo)silane and napthyl-tris-(cyclopentylketoximo)silane.

In certain embodiments, the ketoximo silanes are bisketoximo silanes represented by Formula VII:

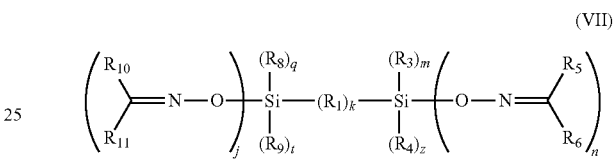

(VII)

wherein j and n are 1, 2, or 3, q and m are 0 or 1, t and z is 0 or 1 and both (n+m+z) and (j+q+t) are equal to 3; $R_3$, $R_4$, $R_8$ and $R_9$ are independently a hydrogen, a $C_1$ to $C_{60}$ hydrocarbyl or alkoxy group, optionally including O, N, S, Si, and/or P heteroatoms; $R_5$, $R_6$, $R_{10}$ and $R_{11}$ are independently a hydrogen, or a $C_1$ to hydrocarbyl group, optionally including O, N, S, Si, and/or P heteroatoms, and may optionally together form a cyclic ring.

Examples of bisketoximosilanes include 1,6-bis-[dimethyl(cyclohexylketoximo)silyl]hexane, 1,6-bis-[methyl-bis-(cyclohexylketoximo)silyl]hexane, 1,6-bis-[tris-(cyclohexylketoximo)silyl)]hexane, 1,5-bis-[dimethyl(cyclohexylketoximo)silyl]pentane, 1,5-bis-[methyl-bis-(cyclohexylketoximo)silyl]pentane, 1,5-bis-[tris-(cyclohexylketoximo)silyl)]pentane, 1,4-bis-[dimethyl(cyclohexylketoximo)silyl]butane, 1,4-bis-[methyl-bis-(cyclohexylketoximo)silyl]butane, 1,4-bis-[tris-(cyclohexylketoximo)silyl)]butane, 1,6-bis-[dimethyl(cyclopentylketoximo)silyl]hexane, 1,6-bis-[methyl-bis-(cyclopentylketoximo)silyl]hexane, 1,6-bis-[tris-(cyclopentylketoximo)silyl)]hexane, 1,5-bis-[dimethyl(cyclopentylketoximo)silyl]pentane, 1,5-bis-[methyl-bis-(cyclopentylketoximo)silyl]pentane, 1,5-bis-[tris-(cyclopentylketoximo)silyl)]pentane, 1,4-bis-[dimethyl(cyclopentylketoximo)silyl]butane, 1,4-bis-[methyl-bis-(cyclopentylketoximo)silyl]butane, 1,4-bis-[tris-(cyclopentylketoximo)silyl)]butane, 1,6-bis-[dimethyl(dimethylketoximo)silyl]hexane, 1,6-bis-[methyl-bis-(dimethylketoximo)silyl]hexane, 1,6-bis-[tris-(dimethylketoximo)silyl)]hexane, 1,5-bis-[dimethyl(dimethylketoximo)silyl]pentane, 1,5-bis-[methyl-bis-(dimethylketoximo)silyl]pentane, 1,5-bis-[tris-(dimethylketoximo)silyl)]pentane, 1,4-bis-[dimethyl(dimethylketoximo)silyl]butane, 1,4-bis-[methyl-bis-(dimethylketoximo)silyl]butane, 1,4-bis-[tris-(dimethylketoximo)silyl)]butane, 1,6-bis-[ethylmethyl(ethylmethylketoximo)silyl]hexane, 1,6-bis-[methyl-bis-(ethylmethylketoximo)silyl]hexane, 1,6-bis-[tris-(ethylmethylketoximo)silyl)]hexane, 1,5-bis-[ethylmethyl(ethylmethylketoximo)silyl]pentane, 1,5-bis-[methyl-bis- (ethylmethylketoximo)silyl]pentane, 1,5-bis-[tris-(ethylmethylketoximo)silyl)]pentane, 1,4-bis-[ethylmethyl(ethylmethylketoximo)silyl]butane, 1,4-bis-[methyl-bis-(ethylmethylketoximo)silyl]butane and 1,4-bis-[tris-(ethylmethylketoximo)silyl)]butane.

In other embodiments, the ketoximo silanes are sulfur containing monoketoximo silanes represented by Formula VIII:

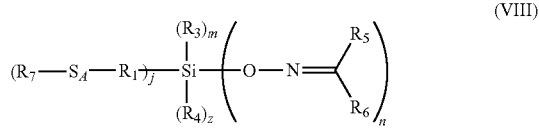

(VIII)

wherein n is 1, 2, or 3, m is 0 or 1, z is 0 or 1 and (n+m+z) is equal to 3; j is greater than or equal to 1; A is greater than or equal to 1; $R_1$ is a divalent organic group and may optionally include O, N, S, Si, and/or P heteroatoms; $R_5$ and $R_6$ are independently H or $C_1$ to $C_{60}$ hydrocarbyl group, optionally including O, N, S, Si, and/or P heteroatoms, and may optionally together form a cyclic ring; $R_7$ is H, $C_1$ to $C_{60}$ saturated or unsaturated alkyl groups and may and optionally include O, N, S, Si, and/or P heteroatoms, with the proviso $R_7$ is H only when A is equal to 1.

Examples of sulfur containing monoketoximosilanes include (mercaptohydrocarbyl)dihydrocarbyl(dihydrocarbylketoximo)silane, (mercaptohydrocarbyl)hydrocarbyl-bis-(dihydrocarbylketoximo)silane, (mercaptohydrocarbyl)-tris-(dihydrocarbylketoximo)silane, including mercaptoalkyldialkyl(cycloalkylketoximo)silane, mercaptoalkyldialkyl(dialkylketoximo)silane, mercaptoalkyldiaryl (diarylketoximo)silane and mercaptoaryldialkyl(diarylketoximo)silane.

Examples of (mercaptohydrocarbyl)dihydrocarbyl(dihydrocarbylketoximo)silanes, (mercaptohydrocarbyl)hydrocarbyl-bis-(dihydrocarbylketoximo)silanes, (mercaptohydrocarbyl)-tris-(dihydrocarbylketoximo)silanes include (3-mercaptopropyl)dimethyl(cyclohexylketoximo)silane, (3-mercaptopropyl)dimethyl(cyclopentylketoximo)silane, (3-mercaptopropyl)dimethyl(ethylmethylketoximo)silane, (3-mercaptopropyl)dimethyl(dimethylketoximo)silane, (3-mercaptopropyl)diphenyl(methylphenylketoximo)silane, (3-mercaptopropyl)methyl-bis-(cyclohexylketoximo)silane, (3-mercaptopropyl)methyl-bis-(cyclopentylketoximo)silane, (3-mercaptopropyl)methyl-bis-(ethylmethylketoximo)silane, (3-mercaptopropyl)methyl-bis-(dimethyl-ketoximo)silane, (3-mercaptopropyl)phenyl-bis-(methylphenylketoximo)silane, (3-mercaptopropyl)-tris-(cyclohexylketoximo)silane, (3-mercaptopropyl)-tris-(cyclopentylketoximo)silane, (3-mercaptopropyl)-tris-(ethylmethylketoximo)silane and (3-mercaptopropyl)-tris-(dimethylketoximo)silane.

Other examples of sulfur containing monoketoximo silanes include the methyl, ethyl, propyl and butyl thioethers of the previously named mercaptans.

In another embodiment the ketoximo silanes are sulfur containing bisketoximo silanes represented by Formula IX:

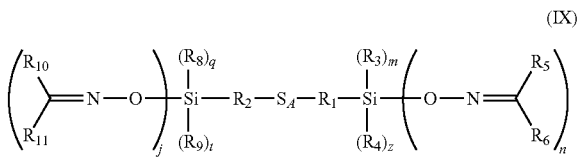

(IX)

wherein j and n are 1, 2, or 3, q and m are 0 or 1, t and z is 0 or 1 and both (n+m+z) and (j+q+t) are equal to 3; A is greater than or equal to 1, $R_3$, $R_4$, $R_8$ and $R_9$ are independently H, $C_1$ to $C_{60}$ hydrocarbyl or alkoxy group, optionally including O, N, S, Si, and/or P heteroatoms; $R_5$, $R_6$, $R_{10}$ and $R_{11}$ are independently H or $C_1$ to $C_{69}$ hydrocarbyl group, optionally including O, N, S, Si, and/or P heteroatoms, and may optionally together form a cyclic ring.

Examples of sulfur containing bisketoximo silanes include bis-(3-(dimethyl(cyclohexylketoximo)silyl)propyl)tetrasulfide, bis(3-(dimethyl(cyclopentylketoximo)silyl)propyl)tetrasulfide, bis(3-dimethyl(dimethylketoximo)silyl)propyl) tetrasulfide, bis(3-dimethyl(ethylmethylketoximo)silyl) propyl)tetrasulfide, bis-(3-(dimethyl(cyclohexylketoximo) silyl)propyl)disulfide, bis(3-(dimethyl (cyclopentylketoximo)silyl)propyl)disulfide, bis(3-dimethyl (dimethylketoximo)silyl)propyl)disulfide, bis(3-dimethyl (ethylmethylketoximo)silyl)propyl)disulfide, bis-(3-(tris-(cyclohexylketoximo)silyl)propyl)tetrasulfide, bis(3-(tris-(cyclopentylketoximo)silyl)propyl)tetrasulfide, bis(3-tris-(dimethylketoximo)silyl)propyl)tetrasulfide, bis(3-(tris-(ethylmethylketoximo)silyl)propyl)tetrasulfide, bis-(3-(tris-(cyclohexylketoximo)silyl)propyl)disulfide, bis(3-(tris-(cyclopentylketoximo)silyl)propyl)disulfide, bis(3-tris-(dimethylketoximo)silyl)propyl)disulfide and bis(3-tris-(ethylmethylketoximo)silyl)propyl)disulfide.

In an embodiment, the ketoximo silane reacts with inorganic fillers such as silica in a rubber composition, thereby improving filler dispersion. The ketoximo silane acts as a shielding agent on the silica, and reduces filler flocculation, thereby preserving filler dispersed morphology. Without being bound by theory, the oxime functionality of the ketoximo silane effectively exchanges with hydroxyl groups on the inorganic filler, and the moiety other than ketoximo moiety provides the shielding effect. This results in a compound with lower compound Mooney viscosity as well as a lower degree of filler flocculation that will improve the processing and increase productivity. At the same time, unlike alkoxysilane coupling agents, the ketoximo silane when mixed in rubber compositions does not produce any VOC. Due to its structure, it does not produce any alcohol by-products when mixed in rubber.

To further reinforce the rubber composition with ketoximo silane, a coupling agent may be used. Thus, a silica reinforcing system includes a ketoximo silane as a silica shielding agent, and a silica coupling agent. With the addition of silica coupling agent and ketoximo silane in a silica filled rubber composition, the high strain modulus and Lambourn wear resistance may be improved along with reduced 60° C. tan δ without the sacrifice of 0° C. tan δ or processability, while maintaining very low VOC. For example, in an embodiment, the 60° C. tan δ may be reduced by 10% or more, such as 15 to 30% or 12 to 25% without the sacrifice of 0° C. tan δ. The reduced VOC compositions are environmentally desirable, as well as a benefit to tire plants through better processing, handling, and higher production efficiency.

In an embodiment, the ketoximo silane is provided as a coating on an inorganic filler surface, wherein the inorganic filler reacts with the ketoximo silane.

Without being bound by theory, the ketoximo silane shielding agent itself does not bind to the elastomer. Thus, in some embodiments, compositions that include the ketoximo silane are exclusive of polymers functionalized with ketoximo silane.

In some embodiments, such as the embodiments shown in Formulas (VII) and (IX), the ketoximo silane can be in the form of a coupling agent that will bind to the elastomer.

In an embodiment, the ketoximo silane can be made by reacting an oxime containing compound, such as an ketoxime, with a siloxane compound, such as an alkoxy compound in solvent, such as an organic solvent. Mixing and heating may be applied to facilitate. In certain embodiments where an ketoxime is part of the starting materials, the reaction may result in evolution of an alcohol by-product.

In some embodiments, the alkyl group in the alkoxy moiety is a short alkyl chain having 1 to 2 carbon atoms, because the alcohol will evolve, thereby isolating the ketoximo silane species. In some embodiments, $R_5$ and $R_6$ are alkyl chains having 1 to 6 carbon atoms, such as 1 to 3 or 3 to 6. In some embodiments, one or more of $R_1$, $R_2$, $R_3$ and $R_4$ contain a moiety that binds to the elastomer.

In one embodiment, n-octyldimethyl methylethylketoximo silane is made by reacting 2-butanaone oxime with n-octyldimethylmethoxysilane in a solvent, such as toluene. The mixture can be heated and refluxed at an elevated temperature, such as about 135° to about 150° C. until the evolved methanol ceases. The product can be obtained after removing the residual alcohol and solvent.

In yet another embodiment, n-octyldimethyl methylethylketoximo silane is made by reacting 2-butanaone oxime (in excess) with n-octyldimethylchlorosilane in a solvent, such as toluene. The mixture can be heated and refluxed at an elevated temperature, such as about 120° to about 150° C. until reaction is complete. The product can be obtained after removing the residual by-product(s).

In addition, the alkoxy or siloxane moieties of common silica coupling agents such as NXT silane, SI363 silane, AMS (alkoxy-modified silsesquioxane), co-AMS (described in U.S. application Ser. No. 12/347,017, filed Dec. 30, 2008, which is incorporated herein by reference), mercaptoalkyltrialkoxy silanes, blocked mercaptoalkyltrialkoxy silanes, mercaptoalkylsilanes bound to silica, blocked mercaptoalkylsilanes bound to silica, bis(trialkoxysilylorgano)tetrasulfides or disulfides can be replaced by the oxime group of the ketoximo silanes described above.

Those of skill in the art will be able to synthesize such species, for example, by applying the methods described in T. Shinohara, M. Arai, U.S. Pat. No. 4,033,991, Shin-Etsu Chemical Company, 1977.

In an embodiment, the rubber composition containing a ketoximo silane may also include an inorganic-filler coupling agent, preferably a silica coupling agent, such as sulfur-containing coupling agents including mercaptoalkyltrialkoxy silanes, blocked mercaptoalkyltrialkoxy silanes, mercaptoalkylsilanes bound to silica, blocked mercaptoalkylsilanes bound to silica, bis(trialkoxysilylorgano)tetrasulfides or disulfides, in an amount of about 0.05 to about 3% based on the silica. A specific commercial product containing a mercaptosilane supported on silica is available from PPG Industries, as CIPTANE 255LD or AGILON that is a mercaptosilane fixed to silica with substantially no trialkoxysilane present. When this product is used, the amount of silica in the rubber compound can be adjusted for the added silica from the CIPTANE 255LD or AGILON to make the desired total amount of silica. In this description the use of the term "blocked mercaptoalkyltrialkoxysilane" is defined as a mercaptosilane silica coupling agent that comprises a blocking moiety that blocks the mercapto part of the molecule (i.e. the mercapto hydrogen atom is replaced by another group, hereafter referred to as "blocking group") while not affecting the silica-reactive mercaptosilane moiety. Suitable blocked mercaptosilanes can include, but are not limited to, those described in U.S. Pat. Nos. 6,127,468; 6,204,339; 6,528,673; 6,635,700; 6,649,684; 6,683,135; the disclosures of which are hereby incorporated by reference with respect to the examples described. For purposes of this disclosure, the silica-reactive "mercaptosilane moiety" is defined as the molecular weight equivalent to the molecular weight of γ-mercaptopropyl triethoxysilane. A deblocking agent can be added later in the manufacturing process, after the silica-silane reaction has occurred, to allow the sulfur atom of the mercaptosilane to bond rapidly with the rubber. The deblocking agent can be added at any time during the compounding process as a single component during any mixing stage in which deblocking is desired. Often deblocking is desired during the curing stage of compounding and the addition of the deblocking agent is added in the final mixing stage. The deblocking agent can be contained in a sulfur cure package and, often, can function as a cure accelerator, especially in combination with a zinc salt. Examples of deblocking agents are well known to those skilled in the art.

The coupling agent may, for example, be present in an amount of about 1% to about 20% by weight of the inorganic filler, such as about 3% to about 10%, about 10% to about 18%, or about 5% to about 15%. The ketoximo silane and coupling agent may, for example, be present in an amount of about 0.1 to about 200% by weight of ketoximo silane relative to the inorganic filler coupling agent, such as about 2% to about 100%, about 1% to about 50%, about 10% to about 60%, about 15% to about 30%, or about 50% to about 100%.

The vulcanizable rubber compound optionally can also include non-alkoxysilane silica shielding agents. Such shielding agents physically associate with the silica, but do not chemically bond to it. These shielding agents alone may not effectively preserve the dispersed silica and suppress the filler flocculation upon heating, but may provide some enhancement of the rubber composition properties. The following are examples of non-alkoxysilane silica shielding agents: glycols such as diethylene glycols, polyethylene glycols, fatty acid esters of hydrogenated or non-hydrogenated $C_5$ or $C_6$ sugars, polyoxyethylene derivatives of fatty acid esters of hydrogenated or non-hydrogenated $C_5$ or $C_6$ sugars, and mixtures thereof, or mineral or non-mineral additional fillers, as described in greater detail below. Further examples of non-alkoxysilane silica shielding agents can be found in U.S. Pat. Nos. 6,221,943 and 6,384,117, both of which are incorporated herein by reference.

Exemplary fatty acid esters of hydrogenated and non-hydrogenated $C_5$ and $C_6$ sugars (e.g., sorbose, mannose, and arabinose) that are useful as non-alkoxysilane silica dispersing aids include, but are not limited to, the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maz® 80. A useful amount of these optional silica dispersing aids is about 0.1% to about 25% by weight based on the weight of the silica, with about 0.5% to about 20% by weight being suitable, and about 1% to about 15% by weight based on the weight of the silica also being suitable.

Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE° (20) sorbitan monooleate, Polysorbate® 80, Tween® 80, Emsorb® 6900, Liposorb® O-20, and T-Maz® 80. The Tween® products are commercially available from ICI Specialty Chemicals. Generally, a useful amount of these optional silica dispersing aids is about 0.1% to about 25% by weight based on the weight of the silica, with about 0.5% to about 20% by weight being suitable, and about 1% to about 15% by weight based on the weight of the silica also being suitable.

The use of the ketoximo silane in rubber compounds not only reduces or eliminates VOC emissions during compounding and further processing of the rubber compositions, but these products also perform well as silica shielding agents, resulting in improved physical properties of the rubber compositions. In particular, as described in the examples below, rubber compositions containing ketoximo silane, and no other silica-dispersing agent, had lower viscosity, suppressed filler flocculation, higher tan delta at 0° C. and 30° C. and longer T5 and Ts2 than comparable compositions containing bis(trialkoxysilylorgano)disulfide or no silane, indicating improved performance characteristics in tire compositions. Other mechanical and dynamic viscoelastic physical properties of the ketoximo silane compositions were acceptable when compared to the comparative examples, indicating that the improved properties were obtained without significantly affecting other physical properties.

As described in the examples below, rubber compositions containing ketoximo silane, and additional inorganic-filler coupling agent, had improved physical properties over comparative rubber compositions containing bis(trialkoxysilylorgano)disulfide or no silane, indicating improved performance characteristics in tire applications.

Furthermore, the ketoximo silane containing rubber composition is free or essentially free of VOC emissions that may be caused by the presence of other silica dispersing agents, when replaced by the ketoximo silane. In these embodiments, the amount of alcohol released from the rubber compounds as VOC during compounding and further processing as a result of the use of the ketoximo silane is zero to about 0.05% by weight of the compound, such as 0 to about 0.01% by weight, or 0 to about 0.001% by weight.

In embodiments where the ketoximo silane is combined with a inorganic-filler coupling agent in a rubber composition, the composition may be tailored to produce only a small amount of VOC emissions, since only a small amount of inorganic-filler coupling agent (which does produce VOC emissions) may be effective to achieve good results, as shown in the Examples below. For example, the VOC emissions may be controlled to be less than about 0.2% by weight of the compound, such as about 0.001% to about 0.2%, or about 0.05% to about 0.1%.

The vulcanizable rubber compounds are compounded with reinforcing inorganic fillers that react with the ketoximo silane, such as silica. Since the ketoximo silane compound does not contain an alkoxysilane group, it would not result in the evolution of VOC during the rubber preparation process.

Examples of suitable inorganic reinforcing fillers may include, but are not limited to, precipitated amorphous silica, wet silica (hydrated silicic acid), dry silica (anhydrous silicic acid), fumed silica, and calcium silicate. Other suitable fillers include aluminum hydrate. Aluminum silicate and magnesium silicate may also be suitable. Precipitated amorphous wet-process, hydrated silicas are a specific example. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. Such inorganic fillers described above may, for example, have a surface area of about 32 $m^2/g$ to about 400 $m^2/g$, such as about 100 $m^2/g$ to about 250 $m^2/g$, or 150 $m^2/g$ to about 220 $m^2/g$. The pH of the silica filler is generally about 5.5 to about 7 or slightly over, such as about 5.5 to about 6.8.

Some of the commercially available silicas that can be used include, but are not limited to, Hi-Sil® 190, Hi-Sil® 210, Hi-Sil® 215, Hi-Sil® 233, and Hi-Sil® 243, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J.M. Huber Corporation.

Because the ketoximo silane compound does not contain an alkoxysilane group that would result in the evolution of VOC, the amount of silica present in a compound can, if desired, be significantly comparative to the amount contained in a compound including additives having alkoxysilane groups, while maintaining low to non-existent VOC emissions. Generally, the silica can be present in an amount of about 15 per hundred parts rubber (phr) to about 200 phr. The silica can also be present in an amount of about 15 phr to about 150 phr, about 15 phr to about 120 phr, about 30 phr to about 90 phr, about 60 phr to about 80 phr. Embodiments may include high loadings of silica, such as about 80 to about 200 phr, about 100 to 190 phr, or about 125 to about 180 phr. The ketoximo silane can be present in an amount of about 0.01 phr to about 15 phr, such as about 0.02 to about 5 phr, about 0.1 to about 4 phr, about 0.5 to about 3.5 phr, or about 1 to about 3 phr. Stated another way, the ketoximo silane can be present in an amount of about 0.0007% to about 100% by weight based on the silica, such as 0.1% to about 20%, about 0.2 to about 15%, about 0.5 to about 10%, or about 1 to about 6% by weight based on the silica.

In another embodiment, the ketoximo silanes disclosed above can be compounded with carbon black. The carbon black can be present in amounts ranging from about one to about 70 phr, such as about five to about 55 phr, or 1 to 10 phr. The carbon blacks can include any of the commonly available, commercially-produced carbon blacks, such as carbon blacks having a surface area (EMSA) of at least 20 $m^2/g$, for example, at least 35 $m^2/g$ up to 200 $m^2/g$ or higher. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the composition described herein. Typical suitable carbon blacks are N-110, N-220, N-339, N-330, N-351, N-550, N-660, as designated by ASTM D-1765-82a. The carbon blacks utilized in the preparation of the vulcanizable elastomeric compositions can be in pelletized form or an unpelletized flocculent mass. For more uniform mixing, unpelletized carbon black may be used. In an embodiment, the composition may include a mixture of organic and inorganic fillers, such as a mixture of carbon black and silica.

Certain additional fillers can be utilized, including mineral fillers, such as clay (hydrous aluminum silicate), talc (hydrous magnesium silicate), aluminum hydrate [Al(OH)₃] and mica, as well as non-mineral fillers such as urea and sodium sulfate. In some embodiments, micas principally contain alumina and silica, although other known variants are also useful. The foregoing additional fillers are optional and can be utilized in the amount of about 0.5 to about 40 phr, about one to about 20 phr and, about one to about 10 phr.

In addition to the ketoximo silanes disclosed above, ketoximes also showed surprising results in carbon black-filled rubber compositions, and may also be used in silica filled compositions. In an embodiment, the ketoxime has the structure of Formula V:

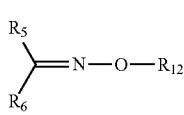

(V)

wherein $R_5$ and $R_6$ are as described above, and $R_{12}$ is a hydrogen, a C1-60 saturated or unsaturated alkyl group and may optionally include O, N, S and/or P heteroatoms, or $R_{12}$ has the structure in Formula VI:

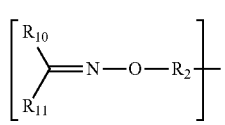

(VI)

wherein $R_2$, $R_{10}$ and $R_{11}$ are as described above. For example, the ketoxime may be cyclic ketoximes, such as those having 4-16 or 6-12 carbon atoms in a cyclic group, for example, cyclohexanone oxime (CHOX), and acyclic ketoximes, such as 2-butanone oxime (BTOX). In an embodiment, the ketoxime may be a dioxime or a trioxime such as dimethylglyoxime.

The ketoxime may, for example, be present in the rubber composition in an amount of about 0.01 to about 20 phr, about 0.5 to about 10 phr, or about 0.25 to about 3 phr.

Ketoximes may be synthesized by techniques known to those of ordinary skill in the art. For example, the reaction product of a condensation reaction of a ketone and a hydroxylamine is a ketoxime. Ketoximes can also be obtained from reaction of nitrites with compounds containing an acidic hydrogen atom.

In embodiments where ketoximes or ketoximo silanes are included as additives in carbon black-filled compounds there was a surprising improvement of compound tear strength and toughness. In addition, some embodiments improved the thermal aging properties of carbon black-filled rubber as well.

Suitable carbon blacks are those described above. The carbon black can be present in amounts ranging from about 20 to about 150 phr, such as about 40 to about 90 phr, or about 50 to about 75 phr. In an embodiment an inorganic filler such as silica may also be present in the ketoxime rubber composition. Suitable silicas and inorganic fillers are those disclosed above.

In an embodiment, the ketoximo can be combined with an alkoxysilane or mercaptosilane, for example in a silica-filled rubber composition.

In one embodiment of the method of making the ketoximo silane, rubber, and silica composition, the vulcanizable compound is prepared by the steps of (a) mixing together at a temperature of about 130° C. to about 200° C. (drop temperature) in the absence of added sulfur and/or cure agents, an elastomer, a ketoximo silane, an inorganic filler that reacts with the ketoximo silane, such as silica or aluminum hydrate, or a mixture thereof with carbon black, and optionally an inorganic-filler coupling agent; (b) allowing the mixture to cool below the mixing temperature of step (a); and (c) mixing the resulting compound with one or more cure agents. The compound may be cured at about 140° C. to about 200° C. for about 5 to about 120 minutes. In certain embodiments, the drop temperature for mixing step (a) can be about 145° C. to about 200° C. or about 155° C. to about 180° C.

The initial mixing step can include at least two substeps. That is, the initial mixing step can comprise the substeps of (i) mixing together at a temperature of about 130° C. to about 200° C., the elastomer, at least a portion of the silica, at least a portion of the ketoximo silane, at least a portion of the optional inorganic-filler coupling agent; (ii) cooling the mixture below the mixing temperature of step (a); and (iii) mixing the mixture obtained in step (ii) with the remainder of the silica, if any, the remainder, if any of the ketoximo silane, and the remainder, if any, of the optional inorganic-filler coupling agent, at a temperature of 130° C. to about 200° C. The temperatures achieved by the at least two substeps can be the same or different from each other, within the temperature range.

In one embodiment, the ketoximo silane and elastomer are added separately to the masterbatch. In another embodiment, the ketoximo silane is added after the optional coupling agent is added.

The method can further include a remill step in which either no ingredients are added to the first mixture, or non-curing ingredients are added, in order to reduce the compound viscosity and improve the dispersion of the silica reinforcing filler. The drop temperature of the remill step is typically about 130° C. to about 200° C., such as about 145° C. to about 165° C.

The final step of the mixing process is the addition of one or more cure agent(s) to the mixture, such as an effective amount of sulfur to achieve a satisfactory cure of the final compound. The temperature at which the final mixture is mixed may be below the vulcanization temperature in order to avoid unwanted precure of the compound. Therefore, in an embodiment, the temperature of the final mixing step does not exceed about 120° C. and is typically about 40° C. to about 120° C., suitably about 60° C. to about 110° C. and, especially, about 75° C. to about 100° C.

In an embodiment of the method of making the carbon black filled, ketoxime or ketoximo silane and rubber composition, the vulcanizable compound is prepared by the steps of (a) mixing together at a temperature of about 130° C. to about 200° C. (drop temperature) in the absence of added sulfur and cure agents, an elastomer, a ketoximo silane or a ketoxime, and carbon black, (b) allowing the resulting compound to cool below the mixing temperature of step (a); and (c) mixing the resulting compound with cure agents. The compound may be cured at about 140° C. to about 200° C. for about 5 to about 120 minutes. In certain embodiments the drop temperature for step (a) is from about 145° C. to about 200° C. or about 155° C. to about 180° C.

The initial mixing step can include at least two substeps. That is, the initial mixing step can comprise the substeps of (i) mixing together at a temperature of about 130° C. to about 200° C., the elastomer, at least a portion of the carbon black, at least a portion of the ketoximo silane or ketoxime, (ii) cooling the mixture below the mixing temperature; and (iii) mixing the mixture obtained in step (ii) with the remainder of the carbon black, if any, the remainder, if any, of the ketoximo silane or ketoxime, at a temperature of 130° C. to about 200° C. The temperatures achieved by the at least two substeps can be the same or different from each other, within the temperature range.

In one embodiment, the ketoximo silane or ketoxime and the elastomer are added separately to the masterbatch. In another embodiment, both ketoxime and ketoximo silane are added to the masterbatch with the elastomer.

The method can further include a remill step in which either no additional ingredients are added to the compound resulting from step (a). The drop temperature of the remill step is typically about 130° C. to about 200° C., such as about 145° C. to about 165° C.

The step (c) of the mixing process is the addition of one or more cure agents to the mixture, such as an effective amount of sulfur to achieve a satisfactory cure of the final compound. The temperature at which the final mixture is mixed may be below the vulcanization temperature in order to avoid unwanted precure of the compound. Therefore, in an embodiment, the temperature of the final mixing step does not exceed about 120° C. and is typically about 40° C. to about 120° C., suitably about 60° C. to about 110° C. and, especially, about 75° C. to about 100° C.

Without being bound to theory it is believed that the oxime functionality functions as an accelerator when mixed in the final stage of the rubber composition along with a cure agent. In an embodiment, the vulcanizable compound is prepared by the steps of (a) mixing together at a temperature of about 130° C. to about 200° C. (drop temperature), in the absence of added cure agents, an elastomer and carbon black, (b) allowing the resulting compound to cool below the mixing temperature of step (a); and (c) mixing the resulting compound with cure agents including an accelerator, the accelerator comprising a compound having an oxime, ketoxime, or ketoximo silane moiety. The resulting compound may be cured at about 140° C. to about 200° C. for about 5 to about 120 minutes. In certain embodiments the drop temperature for step (a) is from about 145° C. to about 200° C. or about 155° C. to about 180° C.

The initial mixing step can include at least two substeps. That is, the initial mixing step can comprise the substeps of (i) mixing together at a temperature of about 130° C. to about 200° C., the elastomer and at least a portion of the carbon black, (ii) cooling the mixture below the mixing temperature; and (iii) mixing the mixture obtained in step (ii) with the remainder of the carbon black, at a temperature of 130° C. to about 200° C. The temperatures achieved by the at least two substeps can be the same or different from each other, within the temperature range.

The method can further include one or more remill steps in which no additional ingredients are added to the compound resulting from step (a). The drop temperature of the remill step is typically about 130° C. to about 200° C., such as about 145° C. to about 165° C.

The final step of the mixing process includes is the addition of an accelerator oxime, ketoxime, or ketoximo silane moiety, and a cure agent, such as an effective amount of sulfur to achieve a satisfactory cure of the final compound. In an embodiment, an additional accelerator, such as DPG, is also included. The temperature of the final mixing step may be below the vulcanization temperature in order to avoid unwanted precure of the compound. Therefore, in an embodiment, the temperature of the final mixing step does not exceed about 120° C. and is typically about 40° C. to about 120° C., suitably about 60° C. to about 110° C. and, especially, about 75° C. to about 100° C.

Based on the disclosure contained herein, and in the Examples described below, one skilled in the art of rubber compounding can determine the effective amount of sulfur required for a satisfactory cure of the compound without undue experimentation. Typical amounts of sulfur are between 1 to 10 phr, such as 1.25 to 6 phr, or 1.5 to 4 phr. The sulfur can take any form, including soluble sulfur, insoluble sulfur, or any of the sulfur-donating compounds described as vulcanizing agents below, or mixtures of the foregoing.

The compositions disclosed herein include solution polymerizable or emulsion polymerizable elastomers. For example, conjugated diene monomers, monovinyl aromatic monomers, or triene monomers, can be anionically polymerized to form conjugated diene polymers, or copolymers or terpolymers of conjugated diene monomers and monovinyl aromatic monomers (e.g., styrene, alpha methyl styrene) and triene monomers. Thus, the elastomeric products can include diene homopolymers from monomer A and copolymers thereof with monovinyl aromatic monomers B. Exemplary diene homopolymers are those prepared from diolefin monomers having from about four to about 12 carbon atoms. Exemplary vinyl aromatic copolymers are those prepared from monomers having from about eight to about 20 carbon atoms. Copolymers can comprise from about 99 percent to about 50 percent by weight of diene units and from about one to about 50 percent by weight of monovinyl aromatic or triene units, totaling 100 percent. The polymers, copolymers, and terpolymers of the present disclosure can have 1,2-microstructure contents ranging from about 10 percent to about 80 percent, with the polymers, copolymers or terpolymers having 1,2-microstructure content of from about 25 to 65 percent, based upon the diene content. The elastomeric copolymers may be random copolymers which result from simultaneous copolymerization of the monomers A and B with randomizing agents, as is known in the art.

Examples of rubber polymers for use in a vulcanized elastomeric composition including the ketoximo silane include styrene/butadiene copolymer, polyisoprene, polybutadiene, butadiene/isoprene copolymer, butadiene/isoprene/styrene terpolymers, isoprene/styrene copolymer, natural rubber, butyl rubber, halobutyl rubber, ethylene-propylene-diene rubber and combinations thereof.

The conjugated diene polymers, or copolymers or terpolymers of conjugated diene monomers and monovinyl aromatic monomers, can be utilized as 100 parts of the rubber in the treadstock compound, or they can be blended with a treadstock rubber which includes natural rubber, synthetic rubber and blends thereof. Such rubbers include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber. When the vulcanizable elastomeric composition is blended with additional rubbers, the amounts can vary widely with a lower limit comprising about ten percent to 20 percent by weight of the total rubber. The minimum amount will depend primarily upon the physical properties desired.

In some embodiments the vulcanizable elastomers may be functionalized with moieties that are reactive with the inorganic filler, such as polymers functionalized with alkoxy or nitrogen-modified alkoxy groups.

Vulcanized elastomeric compounds containing the ketoximo silane or ketoxime are prepared by the method described above. It is readily understood by those having skill in the art that the rubber compound would be compounded by methods generally known in the rubber compounding art, such as mixing the various vulcanizable polymer(s) with various commonly used additive materials such as, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in conventional amounts, in addition to other conventional rubber additives including, for example, other fillers, plasticizers, antioxidants, and cure agents, using standard rubber mixing equipment and procedures.

The compositions disclosed herein may be used to make products including tires, and non-tire products such as power belts and vibration isolators. Decreased rolling resistance is, of course, a useful property for pneumatic tires, both radial as well as bias ply types, and the vulcanizable rubber compositions disclosed herein can be utilized to form treadstocks for such tires. Pneumatic tires can be made according to the constructions disclosed in U.S. Pat. Nos. 5,866,171; 5,876, 527; 5,931,211; and 5,971,046, the disclosures of which are incorporated herein by reference. The composition can also be used to form other elastomeric tire components such as subtreads, sidewalls, body ply skims, bead fillers, apex, chafer, sidewall insert, wirecoat, and inner liner.

Typical amounts of tackifier resins, if used, comprise about 0.5 to about 10 phr, usually about one to about 5 phr. Typical amounts of compounding aids comprise about one to about 50 phr. Such compounding aids can include, for example, aromatic, naphthenic, and/or paraffinic processing oils. Typical amounts of antioxidants comprise about 0.1 to about 5 phr. Suitable antioxidants, such as diphenyl-p-phenylenediamine, are known to those skilled in the art. Typical amounts of anti-ozonants comprise about 0.1 to about 5 phr.

Typical amounts of fatty acids, if used, which can include stearic acid, palmitic acid, linoleic acid or a mixture of one or more fatty acids, can comprise about 0.5 to about 3 phr. Typical amounts of zinc oxide comprise about one to about 5 phr. Typical amounts of waxes comprise about one to about 2 phr. Often microcrystalline waxes are used. Typical amounts of peptizers, if used, comprise about 0.1 to about 1 phr. Typical peptizers can be, for example, pentachlorothiophenol and dibenzamidodiphenyl disulfide.

The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination.

The vulcanization is conducted in the presence of a sulfur vulcanizing agent. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. The sulfur vulcanizing agents are used in an amount ranging from about 0.1 to about 10 phr, such as about 1.5 to about 7.5 phr, or about 1.5 to about 5 phr.

Accelerators are used to control the time and/or temperature required for vulcanization and to improve properties of the vulcanizate. The vulcanization accelerators used in the disclosed compositions are not particularly limited. Examples include thiazole vulcanization accelerators, such as 2-mercaptobenzothiazole (MBTS), dibenzothiazyl disulfide, N-cyclohexyl-2-benzothiazole sulfenamide (CBS), N-tert-butyl-2-benzothiazole sulfenamide (TBBS); and guanidine vulcanization accelerators, such as diphenylguanidine (DPG). The amount of the vulcanization accelerator used is about 0.1 to about 5 phr, preferably about 0.2 to about 3 phr.

Pneumatic tires comprising at least one component produced from the ketoximo silane-containing or ketoxime-containing sulfur-vulcanized elastomeric compound provide improved properties compared to tires that do not comprise compounds containing.

EXAMPLES

The following examples illustrate methods of preparation of representative rubber compositions and ketoximo silane. However, the examples are not intended to be limiting, as other ketoximo silanes can be prepared according to the described methods. Moreover, the methods are exemplary only and other methods for preparing the ketoximo silane, and rubber compounds, including different compounding formulations, can be determined by those skilled in the art without departing from the scope of the disclosure herein disclosed and claimed.

Example 1

The synthesis of n-octyldimethyl methyethylketoximo silane (ODMKS) was performed as follows. 2-butanone oxime was reacted with n-octyldimethylmethoxysilane in a toluene solvent. The mixture was heated and refluxed at 135-150° C. until the evolution of methanol ceased. The product was obtained after removing the residual methanol and solvent. GC-FID analysis revealed the formation of ODMKS at 97% yield. Alcohol analysis showed 0.02% free methanol and 1.70% latent methanol in ODMKS.

Examples 2-5

The ODMKS was evaluated in a silica (45 phr) filled SBR tread formulation. All of the charges are listed in parts per hundred rubber (phr). The Masterbatch (MB) was prepared at a drop temperature of 153° C., and contained: either 4.5 phr of bis(triethoxysilylpropyl)disulfide ("S2 silane") or 5-8 phr of ODMKS; 100 phr SBR (Firestone Polymer Duradene 706 with 23.5% styrene, vinyl content 11%, and Tg of −62° C.); varying amounts of oil; 2 phr of stearic acid; and 1 phr of 6PPD antioxidant. A remill (RM1) stage was used and mixed to 145° C. to further homogenize the mixture. The final stage included of the addition of 2.5 phr zinc oxide, 1.5 phr TBBS, 1.5 phr MBTS, and 1.5 phr DPG and 1-1.78 phr sulfur as the curatives at 105° C. The loadings of S2 silane, ODMKS, and oil are shown in Table 1. The corresponding liquid content in each was obtained by adjusting the process oil loading. More sulfur was added to Examples 2-4 for compensating for the deficient sulfur when compared to Example 1 (because of the presence of two sulfur atoms in the S2 silane, instead of the single sulfur atom in ODMKS). The resulting rubber samples were cured at 171° C. for 15 minutes.

TABLE 1

|  | Example 2 (Control) | Example 3 (Control) | Example 4 | Example 5 |
|---|---|---|---|---|
| S2 silane | 4.5 | 0 | 0 | 0 |
| ODMKS | 0 | 0 | 5 | 8 |
| Process Oil | 5.5 | 10 | 5 | 2 |
| Sulfur | 1.0 | 1.78 | 1.78 | 1.78 |

The processing of Examples 2-5 was evaluated by examining the compound Mooney viscosity (see Table 2). The Mooney (ML 1+4) viscosity measurement was conducted at 130° C. using a large rotor. The Mooney viscosity was recorded as the torque when the rotor had rotated for 4 minutes. The sample was preheated at 130° C. for 1 minute before the rotor started. $T_5$ is the time required to increase 5 Mooney units during the Mooney-scorch measurement.

TABLE 2

|  | Example 2 (Control) | Example 3 (Control) | Example 4 | Example 5 |
|---|---|---|---|---|
| Mooney (ML 1 + 4) | 55.9 | 89.4 | 43.6 | 43.9 |
| $T_5$ minutes | 18.9 | 10.2 | 57.13 | 42.1 |

Lower Mooney viscosity (ML 1+4) and longer $T_5$ were found in the compounds containing ODMKS (Examples 4 and 5) when compared to those of control Examples 2 and 3. From the results it appears that the ODMKS reacts with silica and acts as a shielding agent to give lower Mooney (ML 1+4) as well as longer $T_5$.

Filler flocculation behavior in Examples 2-5 was evaluated by examining the change of Payne Effect data ($\delta(\Delta G')$) in the Examples containing no curatives before and after the thermal annealing at 171° C. for 15 minutes, where ($\delta(\Delta G')$) is defined as $$\delta(\Delta G') = \Delta G'_{with\ thermal\ annealing} - \Delta G'_{without\ thermal\ annealing}$$

The G' was measured by strain sweep experiment using RPA 2000 Rubber Process Analyzer (Alpha Technologies) at 50° C., 0.1 Hz by varying the strain from 0.25% to 1000%. Rheological data such as loss modulus (G"), strain, shear rate, viscosity, and torque were measured on the same instrument. Thermal annealing at 171° C. for 15 minutes simulated the heat history normally encountered during vulcanization. The annealed rubber compounds were then cooled to 40° C. for thirty minutes before starting the strain sweep experiment using the RPA 2000.

The measured $\delta(\Delta G')$ is an indication of the net change in filler flocculation and the degree of silica hydrophobation. The more filler hydrophobation in the rubber, the less filler will flocculate upon heating, and therefore the lower $\delta(\Delta G')$.

As shown in Table 3, the filler flocculation was found to be largely suppressed by the presence of ODMKS. These results suggest a higher degree of silica hydrophobation in Examples 4 and 5 (containing the ODMKS). The lower $\delta(\Delta G')$ of Examples 4 and 5 indicated the silica shielding (hydrophobtaining) effectiveness of ODMKS in silica-filled rubber. These results are consistent with those findings regarding the improved viscosity of Examples 4 and 5.

TABLE 3

|  | Degree of filler flocculation ($\delta(\Delta G')$) (MPa) |
|---|---|
| Example 2 (Control) | 0.712 |
| Example 3 (Control) | 2.969 |
| Example 4 | 0.182 |
| Example 5 | 0.170 |

Monsanto Rheometer MD2000 was used to characterize the curing process with conditions of a frequency of 1.67 Hz and a strain of 7% at 160° C. TS2 and T90 were obtained from such measurements, and they are the time when torque rises to 2% and 90% of the total torque increase during curing process.

TABLE 4

|  | Example 2 (Control) | Example 3 (Control) | Example 4 | Example 5 |
|---|---|---|---|---|
| Ts2 | 3.63 | 0.91 | 7.44 | 6.45 |
| T90 | 8.35 | 7.74 | 12.96 | 11.56 |
| MH − ML | 18.4 | 16.37 | 10.11 | 11.9 |

The dynamic viscoelastic mechanical properties of Examples 2-5 were obtained from temperature sweep (tmp swp) experiments conducted with a frequency of 31.4 rad/sec using 0.5% strain for temperature ranging from −100° C. to −20° C., and 2% strain for the temperature ranging from −20° C. to 100° C. The 60° C. tan δ data were also obtained from the strain sweep (str swp) measurements at a strain level of 2%. A frequency of 3.14 rad/sec was used for strain sweep which is conducted at 30, 60 and 0° C. with strain sweeping from 0.25% to 14.75%. The other viscoelastic properties were measured by using the dynamic compression test. The sample geometry used for dynamic compression test is a cylindrical button with 9.5 mm in diameter and 15.6 mm in length. The sample was compressed under a static load of 2 kg before testing. After it reached an equilibrium state, the test started with a dynamic compression load of 1.25 kg at a frequency of 1 Hz. The sample was then dynamically compressed and then extended and the resultant displacement and hysteresis (tan δ) were then recorded.

TABLE 5

|  | Example 2 (Control) | Example 3 (Control) | Example 4 | Example 5 |
|---|---|---|---|---|
| 60° C. tan δ | | | | |
| temp sweep | 0.1131 | 0.1034 | 0.1357 | 0.1174 |
| strain sweep | 0.1133 | 0.1074 | 0.1222 | 0.1079 |
| strain sweep RPA | 0.11 | 0.122 | 0.145 | 0.121 |
| Compression Dyna | 0.1068 | 0.1134 | 0.14 | 0.1281 |
| average 60° C. tan δ | 0.1108 | 0.1116 | 0.1357 | 0.1186 |
| 30° C. tan δ | | | | |
| temp sweep | 0.1334 | 0.1266 | 0.1583 | 0.142 |
| strain sweep | 0.1174 | 0.1139 | 0.1419 | 0.1322 |
| Compression Dyna | 0.1242 | 0.1097 | 0.1651 | 0.1601 |
| average 30 C. tan δ | 0.1250 | 0.1167 | 0.1551 | 0.1448 |
| 0° C. tan δ | | | | |
| temp sweep | 0.1683 | 0.1669 | 0.188 | 0.1705 |
| strain sweep | 0.1526 | 0.1338 | 0.174 | 0.162 |
| Compression Dyna | 0.1549 | 0.1503 | 0.2017 | 0.1961 |
| average 0° C. tan δ | 0.1586 | 0.1503 | 0.1879 | 0.1762 |
| −20° C. G' MPa | 12 | 11.8 | 4.46 | 5.58 |

Table 5 shows that Examples 4 and 5 have higher 0° C. and 30° C. tan δ along with lower −20° C. G' when compared to the control Example 2. When the loading of ODMKS is at 8 phr, as in Example 5, the 60° C. tan δ of the composition is comparable to that of the Example 2 composition (which includes S2 silane).

In addition, the tensile mechanical properties of Examples 2-5 were measured using the standard procedure described in ASTM-D 412 at 25° C. The results are shown in Table 6. The test specimen geometries were nicked round rings with a dimension of 2.5 mm in thickness, and 44 mm and 57.5 mm in inside and outside diameters. A specific gauge length of 25.4 mm is used for the tensile test.

TABLE 6

| | M50 (MPa) | M300 (MPa) | Tb (MPa) | Eb % | Toughness (MPa) |
|---|---|---|---|---|---|
| Example 2 | 1.5 | 10.64 | 13.81 | 356 | 20.4 |
| Example 3 | 0.99 | 4.75 | 10.79 | 558 | 26.38 |
| Example 4 | 0.88 | 2.97 | 14.09 | 724 | 33.94 |
| Example 5 | 0.89 | 3.11 | 13.84 | 693 | 32 |

Table 6 shows improved Eb and toughness for Examples 4 and 5.

Examples 6-9

In Examples 6-9 the ODMKS as prepared in Example 1 was evaluated in SBR rubber silica-filled (45 phr) compositions. All of the charges are listed in parts per hundred rubber (phr). The masterbatch, prepared at a drop temperature of 153° C., contained: either 4.5 phr of S2 silane or 3 phr of ODMKS, with or without the 3-mercaptopropyl triethoxy silane (MPTES). Examples 6-9 also contained 100 phr of SBR (Firestone Polymer Duradene 706 with 23.5% styrene, vinyl content 11%, and Tg of −62° C.), 2 phr of stearic acid, 1 phr of 6PPD antioxidant, and varying amounts of oil. A remill stage (RM1) was used and mixed to 145° C. to further homogenize the mixture. The final batch included the addition of 2.5 phr of zinc oxide, 1.5 phr of TBBS, 1.5 phr of MBTS, and 1.5 phr of DPG and 1-1.78 phr of sulfur as the curatives at 105° C. The loadings of the variable ingredients are shown in Table 1. Note that the corresponding liquid content in each was obtained by adjusting the process oil loading. More sulfur was added to Examples 7-9 for compensating for the deficient sulfur when compared to Example 6 (because of the presence of two sulfur atoms in the S2 silane, instead of the single sulfur atom in ODMKS). The resulting rubber samples were cured at 171° C. for 15 minutes.

TABLE 7

| | Example 6 (Control) | Example 7 (Control) | Example 8 | Example 9 |
|---|---|---|---|---|
| S2 silane | 4.5 | 0 | 0 | 0 |
| ODMKS | 0 | 3 | 3 | 3 |
| Process Oil | 5.5 | 7 | 6.6 | 6.25 |
| MPTES | 0 | 0 | 0.4 | 0.75 |
| Sulfur | 1.0 | 1.78 | 1.78 | 1.78 |

The processing of Examples 6-9 was evaluated by examining the compound Mooney viscosity (see Table 8). The Mooney ($ML_{1+4}$) viscosity measurement was conducted at 130° C. using a large rotor. The Mooney viscosity was recorded as the torque when the rotor had rotated for 4 minutes. The sample was preheated at 130° C. for 1 minute before the rotor started. $T_5$ is the time required to increase 5 Mooney units during the Mooney-scorch measurement. Lower Mooney viscosity ($ML_{1+4}$) and longer $T_5$ were found in the compounds containing ODMKS (Examples 7, 8, and 9) when compared to those of Example 6. With the addition of MPTES, the compound Mooney ($ML_{1+4}$) increased, but only to the extent that it is still lower than Control Example 6.

TABLE 8

| | Example 6 (Control) | Example 7 (Control) | Example 8 | Example 9 |
|---|---|---|---|---|
| $ML_{1+4}$ | 65.60 | 45.00 | 53.40 | 62.40 |
| $T_5$ minutes | 19.12 | 17.92 | 17.53 | 13.80 |

VOC of the green compounds were measured following the method in a previous publication by Lin, et al., RC&T, Vol. 75, p. 215, 2002, which is incorporated herein by reference, and the results are shown in Table 9.

TABLE 9

| | Example 6 (Control) | Example 7 (Control) | Example 8 | Example 9 |
|---|---|---|---|---|
| MeOH, wt % | 0.001 | 0.004 | 0.007 | 0.005 |
| EtOH, wt % | 0.532 | N/D | 0.042 | 0.070 |

The latent alcohol in Examples 7-9 is significantly reduced when compared to the control Example 6. Latent ethanol content was not detectable in Example 7.

The dynamic viscoelastic mechanical properties of Examples 6-9 were obtained from temperature sweep (tmp swp) experiments conducted with a frequency of 31.4 rad/sec using 0.5% strain for temperature ranging from −100° C. to −20° C., and 2% strain for the temperature ranging from −20° C. to 100° C. a 2% strain was employed for the measurement. The 60° C. tan δ data were also obtained from the strain sweep (str swp) measurements at a strain level of 2%. A frequency of 3.14 rad/sec was used for the strain sweep which was conducted at 30, 60 and 0° C. with strain sweeping from 0.25% to 14.75%. The other viscoelastic properties were measured by using the dynamic compression test. The sample geometry used for dynamic compression test was a cylindrical button with 9.5 mm in diameter and 15.6 mm in length. The sample was compressed under a static load of 2 kg before testing. After it reached an equilibrium state, the test started with a dynamic compression load of 1.25 kg at a frequency of 1 Hz. The sample was then dynamically compressed and then extended and the resultant displacement and hysteresis (tan δ) were then recorded.

The results of the temperature sweep analysis are shown in Table 10. The 0° C. tan δ of Examples 6-9 were all similar. The 60° C. tan δ of Examples 8 and 9 are 20-60% lower than Example 7, and 10-50% lower than Example 6. The tan δ temperature dependencies of these Examples are shown in FIG. 1. Stronger temperature dependencies were found for Examples 8 and 9. Stronger polymer-filler interactions are thus suggested in Examples 8 and 9. Lower −20° C. G' of Examples 7-9 were also found when compared to the control Example 6.

TABLE 10

| | Example 6 (Control) | Example 7 (Control) | Example 8 | Example 9 |
|---|---|---|---|---|
| 60° C. tanδ | | | | |
| temp sweep | 0.1181 | 0.1097 | 0.09431 | 0.0723 |
| strain sweep | 0.1204 | 0.1232 | 0.1109 | 0.0759 |
| strain sweep RPA | 0.11 | 0.147 | 0.106 | 0.074 |
| average 60° C. tanδ | 0.0871 | 0.0950 | 0.0778 | 0.0556 |
| change in 60° C. tanδ, % | 100.00 | 109.01 | 89.30 | 63.76 |
| 30° C. tanδ | | | | |
| temp sweep | 0.1388 | 0.1321 | 0.1231 | 0.1061 |
| strain sweep | 0.1177 | 0.1205 | 0.1087 | 0.0903 |
| average 30° C. tanδ | 0.0855 | 0.0842 | 0.0773 | 0.0655 |
| change in 30° C. tanδ, % | 100.00 | 98.48 | 90.37 | 76.57 |
| 0° C. tanδ | | | | |
| temp sweep | 0.1717 | 0.1752 | 0.1748 | 0.163 |
| strain sweep | 0.1446 | 0.1515 | 0.1344 | 0.1177 |
| average 0° C. tanδ | 0.1054 | 0.1089 | 0.1031 | 0.0936 |
| change in 0° C. tanδ | 100.0000 | 103.2880 | 97.7553 | 88.7449 |
| −20° C. G' MPa | 11.1 | 7.1 | 6.38 | 5.69 |

The rebound resistance of Examples 6-9 was tested on a Zwick rebound resilience tester. The sample geometry is round with a dimension of 1.50 inches in diameter and 0.075 inches in thickness. The sample pieces were subjected to one half-cycle of deformation. The samples were strained by impacting the test piece with an indentor that is free to rebound after the impact. Rebound resilience is defined as the ratio of mechanical energies before and after impact. Samples were preheated at a temperature of 60° C. for 30 minutes before testing.

The rebound test results are shown in Table 11 where a higher resilience value was found in the analysis of Examples 8 and 9.

TABLE 11

|  | 60° C. Rebound |
|---|---|
| Example 6 (control) | 67.2 |
| Example 7 (control) | 63.8 |
| Example 8 | 71.2 |
| Example 9 | 74.4 |

The tensile mechanical properties were measured using the standard procedure described in the ASTM-D 412 at 25° C. Test specimens were nicked round rings with a dimension of 2.5 mm inches in thickness, and 44 mm and 57.5 mm in inside and outside diameters. A specific gauge length of 25.4 mm inches was used for the tensile test.

TABLE 12

|  | M50 (MPa) | M300 (MPa) | Tb (MPa) | Eb % | Toughness (MPa) |
|---|---|---|---|---|---|
| Example 6 (control) | 1.45 | 12.07 | 16.22 | 358 | 22.95 |
| Example 7 (control) | 0.87 | 3.6 | 12.12 | 583 | 25.16 |
| Example 8 | 1.08 | 8.46 | 15.23 | 430 | 25.72 |
| Example 9 | 1.18 | 11.21 | 11.25 | 298 | 13.21 |

Figure 2:
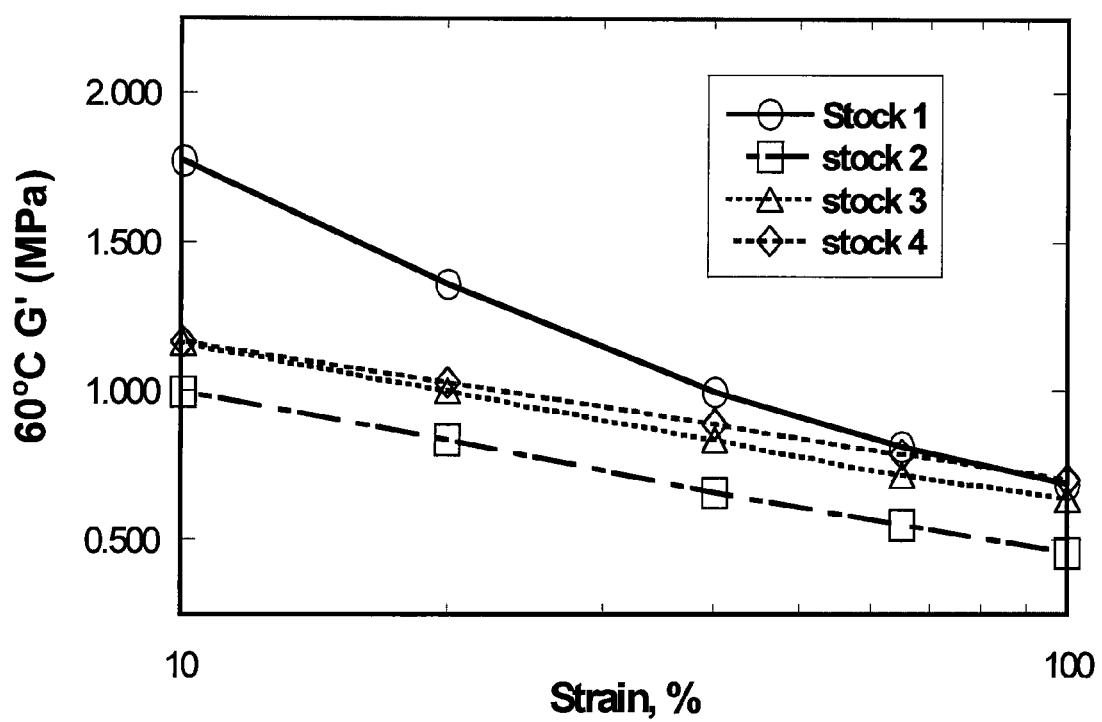
FIG. 2 is a graph of 60° C. G' obtained by a strain sweep of Examples 6-9 (corresponding to stocks 1-4).

Table 12 shows that the moduli, including M50 and M300, of Example 8 was improved over Example 7 (which contained no MPTES). The dynamic elastic modulus G' of Example 8 was also improved over Example 7, as shown in FIG. 2. The G' of Examples 8 and 9 are Comparable to Control Example 6 when measured at high strains.

The wear resistance of Examples 6-9 was evaluated using the Lambourn test. Test wheel specimens had the geometry of circular donuts with the following approximate dimensions: 22.86 mm and 48.26 mm in inside and outside diameter and 4.95 mm in thickness. The test specimens were placed on an axle and run at a slip ratio of 65% against a driven abrasive surface for a period of time. Data were taken as the slope of weight loss (wearing rate) vs. time. The wearing index was obtained from the ratio of the wearing rate of the control to that of the tested sample. Samples with higher wear indices have better wear resistance properties.

TABLE 13

|  | Wear resistance Index |
|---|---|
| Example 6 (control) | 100.00 |
| Example 7 (control) | 64.09 |
| Example 8 | 103.61 |
| Example 9 | 119.57 |

Example 10

The synthesis of n-octyldimethylcyclohexanone ketoximosilane (ODMCKS) is shown in Scheme 1. Into a three-neck round flask equipped with a condenser and a drying tube with $CaCl_2$, 5.8 g (0.25 mol) of sodium and 250 ml of toluene were provided. This was followed by vigorous agitation at the reflux temperature of toluene, to finely divide the metallic sodium. 28.3 g (0.25 mol) of cyclohexanone oxime dissolved 150 ml toluene was slowly added to the resulting mixture. The resulting product has a paste-like consistency and was then cooled to room temperature. 46.5 g (0.225 mol) of octyldimethylchlorosilane (ODMS) was added slowly to the content of the flask. After being refluxed at 130° C. for 1 hour, the mixture was cooled down to room temperature and filtered. The filtrate was stripped of toluene to obtain liquid product. The product was identified by GC-MS and $^1$H-NMR.

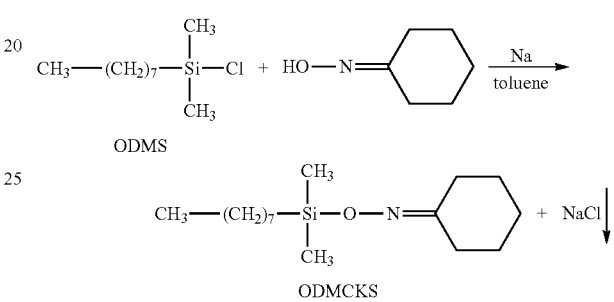

Example 11

In Examples 11A-11G, the n-octyldimethylcyclohexanone ketoximosilane of Example 10, along with other silica coupling agents, was evaluated in silica-filled rubber, as explained below.

100 phr of styrene-butadiene rubber (25% styrene, Tg of −45° C.), was mixed with 55 phr of silica, the silanes listed in Table 14, 10 phr of oil, 2 phr of stearic acid, 2 phr of wax, and 1 phr of 6PPD antioxidant were mixed to 154° C. in a masterbatch (MB). A remill mixing stage (RM1) was used and mixed to 145° C. to further homogenize the mixture. The final mixing stage included the addition of 2.5 phr zinc oxide, 0.7 phr TBBS, 2 phr MBTS, 1.4 phr DPG and varying amounts of sulfur (as listed in Table 14) as the curatives at 105° C. The amounts of sulfur are shown in Table 14. These loadings were constant in Examples 11B-11D, and constant in Examples 11E-11G. The sulfur in Example 11A was lower account for the extra sulfur atoms in the S2 silane. Curing was conducted at 171° C. for 15 minutes.

The ODMCKS synthesized in Example 10 was evaluated in Example 11D. A comparison with S2 silane, was done in Example 11A. Also for comparison purposes, n-octyl methoxydimethylsilane (ODMS) and n-octyl triethoxysilane (OTES) were used in Examples 11C and 11B. The loadings of the silanes were varied in order to keep the molar ratio of the silane functional group constant.

In Examples 11E-11G, an evaluation of the OTES, ODMS, and the ODMCKS (of Example 10), with and without 3-mercaptopropyltriethoxysilane (MPS), was performed.

TABLE 14

| | Example | | | | | | |
|---|---|---|---|---|---|---|---|
| | 11A | 11B | 11C | 11D | 11E | 11F | 11G |
| Silane | S2 | OTES | ODMS | ODMCKS | OTES/MPS | ODMS/MPS | ODMCKS/MPS |
| Silane Loading (phr) | 4.4 | 3.25 | 2.38 | 3.34 | 3.25/0.5 | 2.38/0.5 | 3.34/0.5 |
| Sulfur (phr) | 1.5 | 2.24 | 2.24 | 2.24 | 2.173 | 2.173 | 2.173 |

The processing of the rubber compound was evaluated by examining the compound Mooney. Mooney viscosity (ML) measurements were conducted at 130° C. using a large rotor. The Mooney viscosity was recorded as the torque when the rotor had rotated for 4 minutes. The sample was preheated at 130° C. for 1 minute before the rotor starts.

In comparison to the Example 11A (including S2 silane), ML was reduced in the tested compounds.

TABLE 15

| | Example | | | | | | |
|---|---|---|---|---|---|---|---|
| | 11A | 11B | 11C | 11D | 11E | 11F | 11G |
| ML | 64.1 | 60.6 | 51.8 | 56.2 | 57.6 | 51.6 | 55.6 |

Monsanto Rheometer MD2000 was used to characterize the stock curing process at a frequency of 1.67 Hz and a strain of 7% at 160'C. TS2 and T90 were obtained from such measurements and were respectively the time when torque rises to 2% and 90% of the total torque increase during curing process. The results are shown in Table 16.

TABLE 16

| | Example | | | | | | |
|---|---|---|---|---|---|---|---|
| | 11A | 11B | 11C | 11D | 11E | 11F | 11G |
| TS2 | 2.45 | 2.23 | 2.42 | 1.62 | 2.5 | 2.88 | 2.03 |
| T90 | 8.02 | 6.31 | 6.58 | 5.3 | 6.05 | 6.01 | 4.49 |
| MH − ML | 20.14 | 18.99 | 20.14 | 21.43 | 20.07 | 20.03 | 20.65 |

As shown in Table 17, the n-octyldimethylcyclohexanone ketoximosilane (ODMCKS) improved the toughness of the silica filled rubber at both 23 and 100° C. compared to the OTES, without an increase of compound Mooney. The addition of 3-mercaptopropyltriethoxysilane (MPS) improved the M50 and M300 for all shielding agents.

TABLE 17

| | 11A | 11B | 11C | 11D | 11E | 11F | 11G |
|---|---|---|---|---|---|---|---|
| Ring Tensile at 25° C. | | | | | | | |
| M50 (MPa) | 1.07 | 0.75 | 0.74 | 0.75 | 0.91 | 0.91 | 0.98 |
| M300 (MPA) | 7.55 | 3.17 | 2.83 | 2.75 | 6.00 | 5.95 | 6.46 |
| Tb (MPa) | 12.49 | 9.17 | 9.95 | 9.63 | 10.44 | 13.80 | 10.31 |
| Eb % | 404 | 582 | 626 | 623 | 422 | 508 | 406 |
| Toughness (MPa) | 20.41 | 20.98 | 22.84 | 21.95 | 18.02 | 28.08 | 17.30 |
| Ring Tensile at 25° C. after thermal aging at 100° C. | | | | | | | |
| M50 (MPa) | 1.21 | 1.07 | 1.04 | 1.07 | 1.07 | 1.08 | 1.18 |
| M300 (MPa) | 9.27 | 5.89 | 5.17 | 5.29 | 8.12 | 7.53 | 8.57 |
| Tb (MPa) | 13.00 | 9.54 | 10.83 | 9.24 | 12.26 | 13.68 | 13.23 |
| Eb % | 370 | 414 | 490 | 438 | 390 | 438 | 400 |
| Toughness (MPa) | 19.46 | 16.98 | 22.28 | 17.55 | 19.84 | 24.86 | 21.65 |
| Dumbell Tensile at 23° C. | | | | | | | |
| M50 (MPa) | 1.79 | 1.21 | 1.09 | 1.16 | 1.49 | 1.43 | 1.48 |
| M300 (MPa) | — | 6.03 | 4.84 | 4.78 | 10.96 | 10.10 | 10.58 |
| Tb (MPa) | 11.5 | 11.5 | 13.8 | 13.4 | 18.3 | 16.1 | 15.1 |
| Eb % | 275 | 469 | 558 | 556 | 432 | 413 | 384 |
| Toughness (MPa) | 13.89 | 23.55 | 30.01 | 29.27 | 33.28 | 27.73 | 24.36 |
| Dumbell Tensile at 100° C. | | | | | | | |
| M50 (MPa) | 1.72 | 1.16 | 1.06 | 1.13 | 1.52 | 1.50 | 1.58 |
| M300 (MPa) | — | 5.62 | 4.71 | 4.66 | — | — | — |
| Tb (MPa) | 7.6 | 5.3 | 5.6 | 5.7 | 7.8 | 7.9 | 7.0 |
| Eb % | 205 | 280 | 340 | 348 | 248 | 261 | 227 |
| Toughness (MPa) | 6.86 | 7.52 | 9.44 | 10.09 | 9.05 | 9.47 | 7.71 |

As shown in Tables 15 and 17, the n-octyldimethylcyclohexanone ketoximosilane (ODMCKS) improved the toughness of the silica-filled rubber at both 23° C. and 100° C. compared to OTES Examples 11B and 11E, without an increase of compound Mooney.

As reported in Table 18, the compound stiffness was measured by (1) the dynamic shear viscoelastic mechanical properties from (a) temperature sweep (tmp swp) experiments conducted with a frequency of 31.4 rad/sec using 0.5% strain for temperature ranging from −100° C. to −20° C., and 2% strain for the temperature ranging from −20° C. to 100° C.; (b) strain sweep (str swp) measurements with a frequency of 3.14 rad/sec and strain sweeping from 0.25% to 14.75%; and (c) Dynamic compression testing. The sample geometry used for dynamic compression test is a cylindrical button with 9.5 mm in diameter and 15.6 mm in length. Sample was compressed under a static load of 2 kg before testing. After it reached an equilibrium state, the test started with a dynamic compression load of 1.25 kg at a frequency of 1 Hz. The sample was then dynamically compressed and then extended and the resultant tan δ were then recorded.

TABLE 18

|  | 11A | 11B | 11C | 11D | 11E | 11F | 11G |
| --- | --- | --- | --- | --- | --- | --- | --- |
| 60° C. tan δ | | | | | | | |
| temp sweep | 0.1264 | 0.1110 | 0.1102 | 0.1100 | 0.1133 | 0.1171 | 0.1024 |
| strain sweep | 0.1397 | 0.1339 | 0.1279 | 0.1398 | 0.1185 | 0.1187 | 0.1199 |
| strain sweep RPA | 0.120 | 0.140 | 0.143 | 0.139 | 0.123 | 0.124 | 0.126 |
| Compression Dynastat | 0.1290 | 0.1419 | 0.1442 | 0.1433 | 0.1135 | 0.1149 | 0.1212 |
| 60° C. | | | | | | | |
| Δ G' (MPa) | 2.727 | 2.564 | 2.439 | 2.681 | 2.316 | 1.922 | 2.306 |
| Δ tan δ | 0.05068 | 0.04988 | 0.04482 | 0.05997 | 0.04461 | 0.02501 | 0.04085 |
| Rebound | 63.4 | 61.0 | 60.4 | 60.2 | 66.0 | 65.8 | 64.8 |
| 30° C. tan δ | | | | | | | |
| temp sweep | 0.1535 | 0.1387 | 0.1353 | 0.1317 | 0.1424 | 0.1422 | 0.1257 |
| strain sweep | 0.2198 | 0.1984 | 0.1919 | 0.2022 | 0.1862 | 0.1799 | 0.1822 |
| Compression Dynastat | 0.1465 | 0.1553 | 0.1660 | 0.1539 | 0.1381 | 0.1388 | 0.1411 |
| G' (MPa) | 3.975 | 3.254 | 2.734 | 3.333 | 3.367 | 2.835 | 3.485 |
| 0° C. tan δ | | | | | | | |
| temp sweep | 0.1919 | 0.2012 | 0.1944 | 0.1846 | 00.2024 | 0.1984 | 0.1811 |
| strain sweep | 0.1708 | 0.1713 | 0.1723 | 0.1604 | 0.1639 | 0.1562 | 0.1577 |
| Compression Dynastat | 0.3499 | 0.1995 | 0.2035 | 0.1927 | 0.1751 | 0.1836 | 0.1784 |
| G' (MPa) | 5.214 | 4.315 | 3.753 | 4.572 | 4.237 | 3.654 | 4.186 |
| −20° C. G' MPa | 16.8 | 15.2 | 13.9 | 16.3 | 14.3 | 11.5 | 11.0 |

Example 12

The n-octyldimethylcyclohexanone ketoximosilane, synthesized as in Example 10 above, and cyclohexanone oxime were evaluated in carbon black filled rubbers as described below.

A 50 phr carbon black formulation was used for compounding and the oil content in each Example was adjusted to account for the presence of the additives. All of the charges are listed in parts per hundred rubbers (phr). n-Octyldimethylcyclohexanone ketoximosilane (ODMCKS) or cyclohexanone oxime (CHOX) were used as additives. 100 phr of styrene-butadiene rubber (25% styrene, Tg of −45° C.), various amount of oil, 2 phr of stearic acid, and 0.95 phr of 6PPD were mixed to 165° C. in a masterbatch (MB) stage. A remill stage (RM1) was used and mixed to 160° C. to further homogenize the mixture. The final stage consisted of the addition of 2.5 phr of zinc oxide, 1.5 phr of TBBS, 1.5 phr of MBTS, 1.5 phr of DPG and 1.5 phr of sulfur as the curatives at 105° C. The ingredient loadings are shown in Table 18. Curing was conducted at 171° C. for 15 minutes. The control Example 12A was in the absence of ODMCKS or CHOX additive.

TABLE 19

|  | Example | | | | |
| --- | --- | --- | --- | --- | --- |
|  | 12A | 12B | 12C | 12D | 12E |
| Additive | None | ODMCKS | ODMCKS | ODMCKS | CHOX |
| Loading (phr) | — | 1.21 | 2.42 | 4.84 | 1.87 |
| Processing oil (phr) | 10 | 8.79 | 7.58 | 5.16 | 8.13 |

Table 19 shows tear strengths of the carbon black filled rubbers.

TABLE 20

|  | Example | | | | |
| --- | --- | --- | --- | --- | --- |
|  | 12A | 12B | 12C | 12D | 12E |
| Tear Strength (N/mm, 171° C.) | 4.13 | 4.42 | 4.53 | 5.54 | 6.20 |
| Travel at tear (%, 171° C.) | 65 | 66 | 66 | 74 | 83 |

Table 20 shows the mechanical properties of the carbon black filled compounds with and without thermal aging. Table 21 shows the thermal aging properties of CHOX and ODMCKS.

TABLE 21

|  | 12A | 12B | 12C | 12D | 12E |
|---|---|---|---|---|---|
| Ring Tensile at 25° C. | | | | | |
| M50 (MPa) | 1.36 | 1.40 | 1.39 | 1.35 | 1.28 |
| M300 (MPa) | — | — | 14.55 | 13.99 | 13.14 |
| Tb (MPa) | 12.82 | 13.79 | 15.56 | 14.37 | 13.48 |
| Eb % | 266 | 284 | 315 | 307 | 306 |
| Toughness (MPa) | 14.10 | 16.63 | 20.21 | 18.30 | 17.06 |
| Ring Tensile at 25° C. after thermal aging at 100° C. | | | | | |
| M50 (MPa) | 1.39 | 1.43 | 1.47 | 1.49 | 1.39 |
| M200 (MPa) | 9.26 | 9.29 | 9.11 | 8.93 | 8.31 |
| Tb (MPa) | 14.80 | 11.20 | 15.33 | 15.29 | 13.98 |
| Eb % | 274 | 226 | 287 | 2292 | 286 |
| Toughness (MPa) | 16.18 | 11.71 | 18.02 | 18.44 | 16.45 |

Example 13

An evaluation of 2-butanone oxime (BTOX) in carbon black filled rubbers was also performed.

Varying amounts of BTOX and oil were added as shown in Table 21 along with 100 phr of styrene-butadiene (SBR) (25% styrene, Tg of −45° C.), 41 phr of carbon black, 2.5 phr ZnO, 2 phr of stearic acid, 1 phr of wax and 0.95 phr of 6PPD. These ingredients were mixed to 160° C. in a masterbatch stage (MB). A remill stage (RM1) was used and mixed to 153° C. to further homogenize the mixture. The final stage included the addition of 1.7 phr of CBS, various amount of DPG, and 1.3 phr of sulfur as the curatives at 105° C. Curing was conducted at 171° C. for 15 minutes.

TABLE 22

| | Example | | | | | |
|---|---|---|---|---|---|---|
| | 13A | 13B | 13C | 13D | 13E | 13F |
| BTOX (phr) | 0 | 0.25 | 0.50 | 1.00 | 2.00 | 3.00 |
| Process oil (phr) | 10 | 9.75 | 9.50 | 9.00 | 8.00 | 7.00 |
| DPG (phr) | 0.2 | 0.2 | 0.2 | 0.15 | 0.1 | 0 |

A Monsanto Rheometer MD2000 was used to characterize the stock curing process with conditions of a frequency of 1.67 Hz and a strain of 7% at 160° C. TS2 and T90 were obtained from such measurement and were respectively the time when torque rises to 2% and 90% of the total torque increase during curing process. There was no significant change of curing characteristic of the rubber stocks as shown in Table 23. The Example 13A with DPG behaved in similar manner to the stock 13F with BTOX.

TABLE 23

| | Example | | | | | |
|---|---|---|---|---|---|---|
| | 13A | 13B | 13C | 13D | 13E | 13F |
| Mooney ML 130° C. | 39.4 | 39.1 | 39.7 | 39.5 | 40.5 | 41 |
| t5 | 24.5 | 25.2 | 26.28 | 25.35 | 25.42 | 25.68 |
| ML | 1.716 | 1.731 | 1.796 | 1.776 | 1.824 | 1.851 |
| MH | 15.3 | 15.4 | 15.1 | 15.2 | 15.19 | 15.01 |
| Ts2 | 4.89 | 5 | 5.08 | 4.95 | 4.98 | 5.15 |
| T10 | 4.57 | 4.71 | 4.77 | 4.7 | 4.78 | 4.95 |
| T90 | 7.79 | 7.62 | 7.69 | 7.5 | 8.15 | 8.23 |
| MH − ML | 13.58 | 13.67 | 13.30 | 13.42 | 13.37 | 13.16 |

An increase of the BTOX content also enhanced the tear strength and the toughness of the rubbers, and slightly increased the content of bound rubber as well.

TABLE 24

| | 13A | 13B | 13C | 13D | 13E | 13F |
|---|---|---|---|---|---|---|
| Ring Tensile at 25° C. | | | | | | |
| M50 (MPa) | 0.94 | 0.89 | 0.97 | 0.98 | 0.93 | 0.95 |
| M300 (MPA) | 7.60 | 7.07 | 7.47 | 7.45 | 6.92 | 6.89 |
| Tb (MPa) | 19.89 | 18.77 | 20.15 | 19.19 | 20.25 | 20.33 |
| Eb % | 557 | 561 | 569 | 553 | 597 | 605 |
| Toughness (MPa) | 44.23 | 42.21 | 45.79 | 42.19 | 48.65 | 49.29 |
| Ring Tensile at 25° C. after thermal aging at 100° C. | | | | | | |
| M50 (MPa) | 1.03 | 0.98 | 1.04 | 1.11 | 1.12 | 1.09 |
| M300 (MPa) | 10.01 | 9.47 | 9.80 | 10.29 | 10.13 | 9.78 |
| Tb (MPa) | 18.31 | 17.66 | 19.03 | 18.25 | 20.33 | 17.96 |
| Eb % | 455 | 463 | 473 | 443 | 488 | 456 |
| Toughness (MPa) | 33.67 | 33.23 | 36.55 | 32.88 | 40.69 | 33.59 |

Example 14

The synthesis of 1,8-bis[(methylethylketoximo)dimethylsiyl]octane (BDMKSO) is shown in Scheme 1.57 g (0.66 mol) of 2-butanaone oxime was mixed with 200 ml toluene in three-neck round flask equipped with a condenser and a drying tube with $CaCl_2$. After refluxing at 130° C. for 2 hours the reactor was cooled to room temperature, and 50 g (0.165 mol) of 1,8-bis(chlorodimethylsiyl) octane (BClDMSO) was charged into the reactor. The reaction mixture was refluxed at 130° C. for 1 hour and was separated into two layers. The top layer was separated and the residual solvent was removed by a rotary evaporator. The product was obtained at 99% purity after distillation and confirmed by GC-MS and $^1$H-NMR.

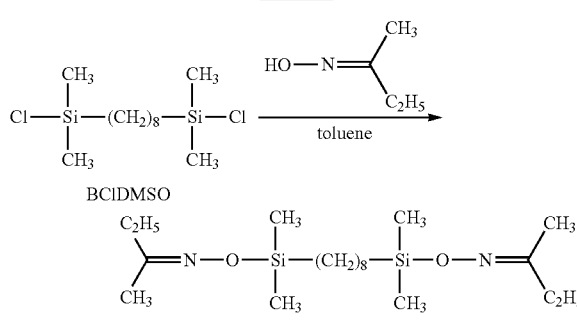

Scheme 2

Examples 15A-G

The BDMKSO was evaluated in a silica (45 phr) filled SBR tread formulation. All of the charges are listed in parts per hundred rubbers (phr). The bis-ketoximo silane, (1,8-bis [(methylethylketoximo)dimethylsiyl]octane (BDMKSO) was used as the filler reinforcing agent. For comparison purposes, a silane without reinforcing capability, n-octyl triethoxysilyl silane (OTES), was also used. The Masterbatch (MB) was prepared at a drop temperature of 153° C., and contained: 100 phr SBR (25% styrene, $T_g$ of −45° C.), and various amounts of oil, 2 phr of stearic acid, 1 phr of 6PPD antioxidant. The loadings of OTES, BDMKSO and oil are shown in Table 25. A remill (RM1) was used and mixed to 145° C. to further homogenize the mixture. The final consisted of the addition of 2.5 zinc oxide, 1.5 TBBS, 1.5 MBTS, and 1.5 DPG, 1.5 sulfur and mixed to a maximum temperature of 105° C. The corresponding liquid content in each of the examples was obtained by adjusting the process oil loading. Curing was conducted at 171° C. for 15 minutes. There is no silane added in stock 1 and it is used as reference stock.

TABLE 25

|  | 15A | 15B | 15C | 15D | 15E | 15F | 15G |
|---|---|---|---|---|---|---|---|
| OTES | 0.00 | 1.18 | 2.36 | 4.73 | 0.00 | 0.00 | 0.00 |
| BDMKSO | 0.00 | 0.00 | 0.00 | 0.00 | 1.72 | 3.42 | 6.84 |
| Process Oil | 7.50 | 6.32 | 5.14 | 2.77 | 5.38 | 3.58 | 0.66 |

The processing of the rubber compound was evaluated by examining the compound Mooney (Table 2). Mooney viscosity (ML) measurement was conducted at 130° C. using a large rotor. The Mooney viscosity was recorded as the torque when rotor has rotated for 4 minutes. The sample is preheated at 130° C. for 1 minute before the rotor starts.

Lower ML's were found in the compounds containing OTES or BDMKSO, as shown in Table 25.

TABLE 26

|  | 15A | 15B | 15C | 15D | 15E | 15F | 15G |
|---|---|---|---|---|---|---|---|
| ML | 106.1 | 81.2 | 65.3 | 55.1 | 72 | 60.1 | 59.1 |

As reported in Table 27, the compound stiffness was measured by (1) the dynamic shear viscoelastic mechanical properties from (a) temperature sweep (tmp swp) experiments conducted with a frequency of 31.4 rad/sec using 0.5% strain for temperature ranging from −100° C. to −20° C., and 2% strain for the temperature ranging from −20° C. to 100° C. (b) a strain sweep (str swp) measurements with a frequency of 3.14 rad/sec and strain sweeping from 0.25% to 14.75%. (c) Dynamic compression testing: The sample geometry used for dynamic compression test is a cylindrical button with 9.5 mm in diameter and 15.6 mm in length. The samples were compressed under a static load of 2 kg before testing. After it reached an equilibrium state, the test started with a dynamic compression load of 1.25 Kg at a frequency of 1 Hz. The sample was then dynamically compressed and then extended and the resultant displacement K' and tan δ were then recorded.

TABLE 27

|  | 15A | 15B | 15C | 15D | 15E | 15F | 15G |
|---|---|---|---|---|---|---|---|
| G' temp swp 30° C., 2% strain | 8.55 | 6.98 | 5.49 | 4.07 | 6.99 | 5.52 | 5.41 |
| G' str swp 30° C., 2% strain | 6.68 | 4.74 | 3.89 | 2.74 | 4.45 | 3.42 | 3.4 |
| G' str swp 30° C., 10% strain | 4.34 | 3.01 | 2.47 | 1.88 | 2.92 | 2.36 | 2.63 |
| K' dynast 30° C., | 3.67 | 2.73 | 1.61 | 1.14 | 2.51 | 1.76 | 1.85 |
| M50 at 25° C. | 0.94 | 0.92 | 0.84 | 0.85 | 0.94 | 0.96 | 1.17 |
| M300 at 25° C. | 4.59 | 4.72 | 4.28 | 4.01 | 5.01 | 4.98 | 6.87 |

The tan δ at 60° C. from various measurements are listed in Table 28.

TABLE 28

|  | 15A | 15B | 15C | 15D | 15E | 15F | 15G |
|---|---|---|---|---|---|---|---|
| temp sweep | 0.0899 | 0.1004 | 0.1124 | 0.1125 | 0.1004 | 0.1054 | 0.0785 |
| strain sweep | 0.1166 | 0.1307 | 0.1391 | 0.122 | 0.1216 | 0.1148 | 0.0811 |
| Compression Dyna | 0.113 | 0.133 | 0.14 | 0.126 | 0.12 | 0.116 | 0.071 |
| average 60° C. tan | 0.1036 | 0.1200 | 0.1346 | 0.1206 | 0.1217 | 0.1027 | 0.0728 |

Example 16

The synthesis of bis[3-(dimethylmethoxysily)propyl]disulfane was performed as follows: at room temperature, 0.564 g chloropropyldimethylchlorosilane was added dropwise to a solution of 50.1 g chloropropyldimethylmethoxysilane in 80 ml methanol. The reaction mixture was refluxed for 1 hour at 80° C. After cooling the mixture to 40° C., 5.04 g sulfur and 13.5 g sodium sulfide was added and refluxed for 1.5 hours at 80° C. After cooling to room temperature, the precipitated sodium chloride was removed by filtration. The product was obtained after removing the residual methanol by a rotary evaporator. $^1$H-NMR and GC-MS analysis confirmed the formation of bis[3-(dimethylmethoxysily)propyl]disulfane Example 17

The synthesis of bis[3-(dimethylketoximosily)propyl]disulfane was performed as follows: a round-bottomed flask was fitted with a stark and Dean trap and a reflux condenser equipped with a $CaCl_2$ drying tube. In this were placed 26 g of 2-Butanaone oxime, 45 g of bis[3-(dimethylmethoxysily) propyl]disulfane and 200 ml toluene. The mixture was heated and refluxed at 135-150° C. until methanol ceased to be evolved. The product was obtained after removing the residual methanol by a rotary evaporator. $^1$H-NMR and GC-MS analysis confirmed the formation of bis[3-(dimethylketoximosily)propyl]disulfane.

It is claimed:
1. A composition comprising:
   an elastomer;
   a ketoximo silane corresponding to:

Formula VII:

$$\left( \begin{matrix} R_{10} \\ R_{11} \end{matrix} \!\!>\!\!=\!\!N\!-\!O\!-\!\left[\begin{matrix}(R_8)_q\\ Si \\ (R_9)_t\end{matrix}\!-\!(R_1)\!-\!\begin{matrix}(R_3)_m\\ Si \\ (R_4)_z\end{matrix}\right]_j\!\!-\!O\!-\!N\!=\!\!<\!\!\begin{matrix}R_5\\ R_6\end{matrix}\right)_n ;\quad (VII)$$

wherein j and n are 1, 2, or 3, q and m are 0 or 1, t and z is 0 or 1 and both (n+m+z) and (j+q+t) are equal to 3; $R_1$ is a $C_1$ to $C_{60}$ divalent organic groups and may optionally include O, N S, Si, and/or P heteroatoms $R_3$, $R_4$, $R_8$ and $R_9$ are independently a hydrogen, a $C_1$ to $C_{60}$ hydrocarbyl or alkoxy group, optionally including O, N, S, Si, and/or P heteroatoms; $R_5$, $R_6$, $R_{10}$ and $R_{11}$ are independently a hydrogen, or a $C_1$ to $C_{60}$ hydrocarbyl group, optionally including O, N, S, Si, and/or P heteroatoms, and may optionally together form a cyclic ring;
   and
   an inorganic filler;
   wherein the elastomer is selected from the group consisting of: styrene/butadiene copolymer, polyisoprene, polybutadiene, butadiene/isoprene copolymer, butadiene/isoprene/styrene terpolymers, isoprene/styrene copolymer, natural rubber, butyl rubber, ethylene-propylene-diene rubber and combinations thereof.

2. The composition of claim 1, wherein the composition is essentially free of volatile organic compounds.

3. The composition of claim 1, wherein the inorganic filler comprises silica.

4. The composition of claim 1, wherein the ketoximo silane is present in an amount of about 0.02 to about 5 phr.

5. The composition of claim 1, wherein the ketoximo silane is selected from n-octyldimethyl methyethylketoximo silane and n-octylcyclohexanone ketoximodimethylsilane.

6. The composition of claim 1, further comprising a coupling agent in an amount of about 1% to about 20% by weight of the inorganic filler.

7. A method comprising:
   mixing
   an elastomer selected from the group consisting of: styrene/butadiene copolymer, polyisoprene, polybutadiene, butadiene/isoprene copolymer, butadiene/isoprene/styrene terpolymers, isoprene/styrene copolymer, natural rubber, butyl rubber, ethylene-propylene-diene rubber and combinations thereof;
   a ketoximo silane corresponding to:

Formula VII:

$$\left( \begin{matrix} R_{10} \\ R_{11} \end{matrix} \!\!>\!\!=\!\!N\!-\!O\!-\!\left[\begin{matrix}(R_8)_q\\ Si \\ (R_9)_t\end{matrix}\!-\!(R_1)\!-\!\begin{matrix}(R_3)_m\\ Si \\ (R_4)_z\end{matrix}\right]_j\!\!-\!O\!-\!N\!=\!\!<\!\!\begin{matrix}R_5\\ R_6\end{matrix}\right)_n ;\quad (VII)$$

wherein j and n are 1, 2, or 3, q and m are 0 or 1, t and z is 0 or 1 and both (n+m+z) and (j+q+t) are equal to 3; $R_1$ is a $C_1$ to $C_{60}$ divalent organic groups and may optionally include O, N S, Si, and/or P heteroatoms $R_3$, $R_4$, $R_8$ and $R_9$ are independently a hydrogen, a $C_1$ to $C_{60}$ hydrocarbyl or alkoxy group, optionally including O, N, S, Si, and/or P heteroatoms; $R_5$, $R_6$, $R_{10}$ and $R_{11}$ are independently a hydrogen, or a $C_1$ to $C_{60}$ hydrocarbyl group, optionally including O, N, S, Si, and/or P heteroatoms, and may optionally together form a cyclic ring;
   and
   an inorganic filler;
   whereby an elastomeric composition is formed.

8. The method of claim 7, being essentially free of VOC evolution.

9. The method of claim 7, wherein the ketoximo silane and elastomer are added separately.

10. The method of claim 7, further comprising vulcanizing the composition to form a vulcanized composition and forming a tire component from the vulcanized composition.

11. The method of claim 7 wherein the ketoximo silane coats the inorganic filler.

12. A tire component comprising:
   an elastomer;
   a ketoximo silane corresponding to:

Formula VII:

$$\left( \begin{matrix} R_{10} \\ R_{11} \end{matrix} \!\!>\!\!=\!\!N\!-\!O\!-\!\left[\begin{matrix}(R_8)_q\\ Si \\ (R_9)_t\end{matrix}\!-\!(R_1)\!-\!\begin{matrix}(R_3)_m\\ Si \\ (R_4)_z\end{matrix}\right]_j\!\!-\!O\!-\!N\!=\!\!<\!\!\begin{matrix}R_5\\ R_6\end{matrix}\right)_n ;\quad (VII)$$

wherein j and n are 1, 2, or 3, q and m are 0 or 1, t and z is 0 or 1 and both (n+m+z) and (j+q+t) are equal to 3; $R_1$ is a $C_1$ to $C_{60}$ divalent organic groups and may optionally include O, N S, Si, and/or P heteroatoms $R_3$, $R_4$, $R_8$ and $R_9$ are independently a hydrogen, a $C_1$ to $C_{60}$ hydrocarbyl or alkoxy group, optionally including O, N, S, Si, and/or P heteroatoms; $R_5$, $R_6$, $R_{10}$ and $R_{11}$ are independently a hydrogen, or a $C_1$ to $C_{60}$ hydrocarbyl group, optionally including O, N, S, Si, and/or P heteroatoms, and may optionally together form a cyclic ring;
   an inorganic filler;
   wherein the composition is incorporated in the tire component.

13. The tire component of claim 12, wherein the composition is essentially free of volatile organic compounds.

14. The tire component of claim 12, wherein the inorganic filler comprises silica.

15. The tire component of claim 12, wherein the ketoximo silane is present in an amount of about 0.02 to about 5 phr.

16. The tire component of claim 12, wherein the ketoximo silane is selected from n-octyldimethyl methyethylketoximo silane and n-octylcyclohexanone ketoximodimethylsilane.

17. The tire component of claim 12, further comprising a coupling agent in an amount of about 1% to about 20% by weight of the inorganic filler.

* * * * *